United States Patent
Chillariga et al.

(10) Patent No.: US 7,020,115 B2
(45) Date of Patent: Mar. 28, 2006

(54) FAST MACRODIVERSITY SWITCHING WITH TIME MANAGEMENT IN WIRELESS NETWORKS

(76) Inventors: Gopal Chillariga, 125 Connemara Way, #160, Sunnyvale, CA (US) 94087; Bhupal Kanaiyalal Dharia, 10768 Maxine Ave., Cupertino, CA (US) 95014; Gerhard Albert Koepf, 700 Kalmia Ave., Boulder, CO (US) 80304-1738; Lance Kazumi Uyehara, 1026 Del Cambre Dr., San Jose, CA (US) 95129

(*) Notice: Subject to any disclaimer, the term of this patent is extended or adjusted under 35 U.S.C. 154(b) by 1127 days.

(21) Appl. No.: 09/879,603

(22) Filed: Jun. 12, 2001

(65) Prior Publication Data

US 2002/0122406 A1  Sep. 5, 2002

Related U.S. Application Data

(63) Continuation-in-part of application No. 09/750,592, filed on Dec. 28, 2000.

(51) Int. Cl.
  *H04J 3/00* (2006.01)
  *H04J 3/06* (2006.01)
(52) U.S. Cl. ........................... 370/337; 370/508
(58) Field of Classification Search ................ 370/329, 370/337, 321, 347, 508, 516
See application file for complete search history.

(56) References Cited

U.S. PATENT DOCUMENTS

| | | | |
|---|---|---|---|
| 5,663,958 A * | 9/1997 | Ward | 370/347 |
| 5,974,032 A * | 10/1999 | Snowden et al. | 370/316 |
| 6,125,125 A * | 9/2000 | Narasimha et al. | 370/510 |
| 6,192,038 B1 * | 2/2001 | Wallerius et al. | 370/328 |
| 6,304,837 B1 * | 10/2001 | Geiger et al. | 703/14 |
| 6,341,124 B1 * | 1/2002 | Johansson et al. | 370/329 |
| 6,381,234 B1 * | 4/2002 | Sakoda et al. | 370/336 |
| 6,484,287 B1 * | 11/2002 | Hagele et al. | 714/807 |
| 6,636,550 B1 * | 10/2003 | Horikoshi et al. | 370/342 |
| 6,724,739 B1 * | 4/2004 | Tiedemann et al. | 370/331 |
| 6,850,501 B1 * | 2/2005 | Sebire | 370/329 |

* cited by examiner

*Primary Examiner*—Andy Lee
(74) *Attorney, Agent, or Firm*—Berkeley Law & Technology Group

(57) ABSTRACT

A communication system for communication using wireless signals in a fast macrodiversity switching environment. The wireless signals include downlink signals to and uplink signals from mobile stations where the wireless signals have bursts in time slots. In the communication system, a plurality of transceiver stations have broadcast channels (non-switched) and dedicated channels (switched) for the wireless signals. A zone manager controls the fast macrodiversity switching of bursts in dedicated channels among transceiver stations. The fast macrodiversity switching causes the bursts to have time shifts that are of a magnitude to cause unwanted burst overlap. A macrodiversity timing control controls the timing of bursts, to reduce burst overlap, in dedicated channels that have been dynamically switched timing problem.

49 Claims, 8 Drawing Sheets

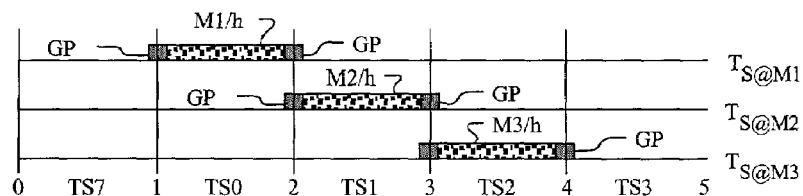
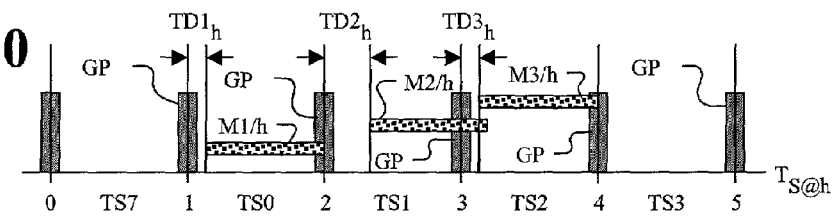
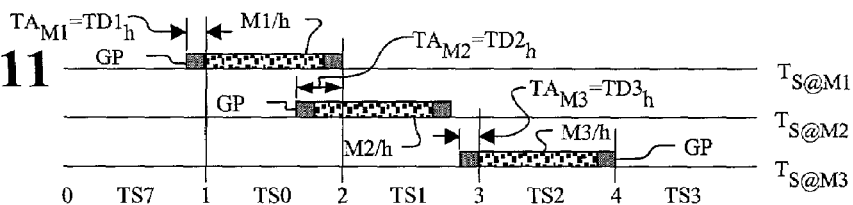
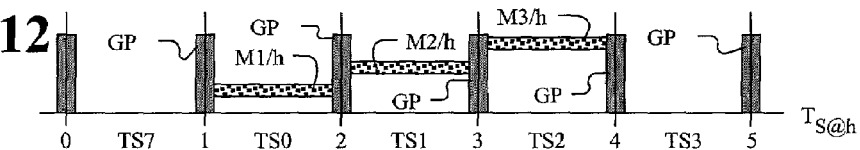
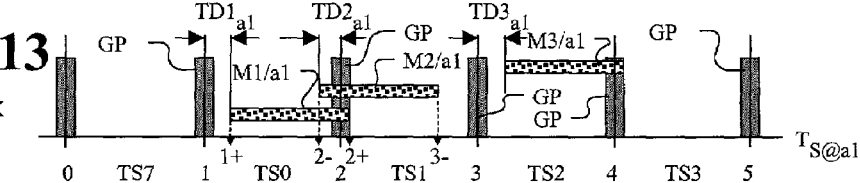
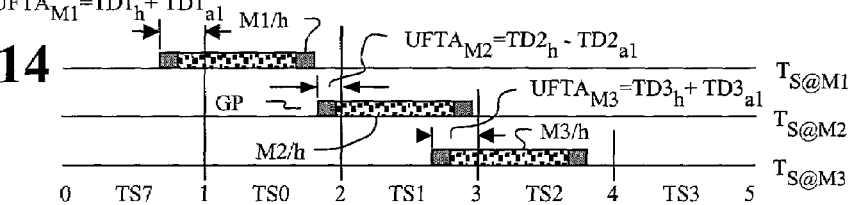
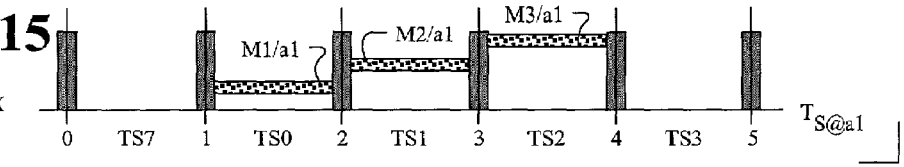

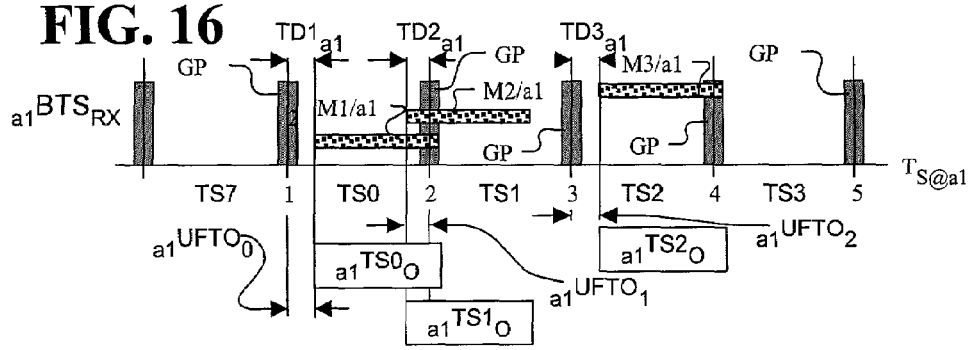
FIG. 16
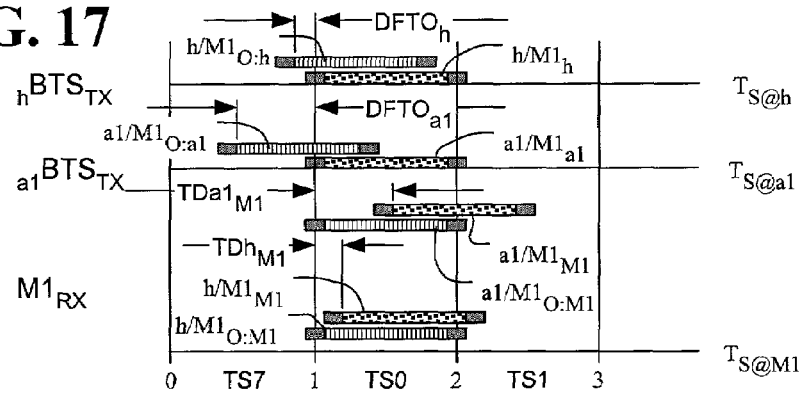
FIG. 17
FIG. 18
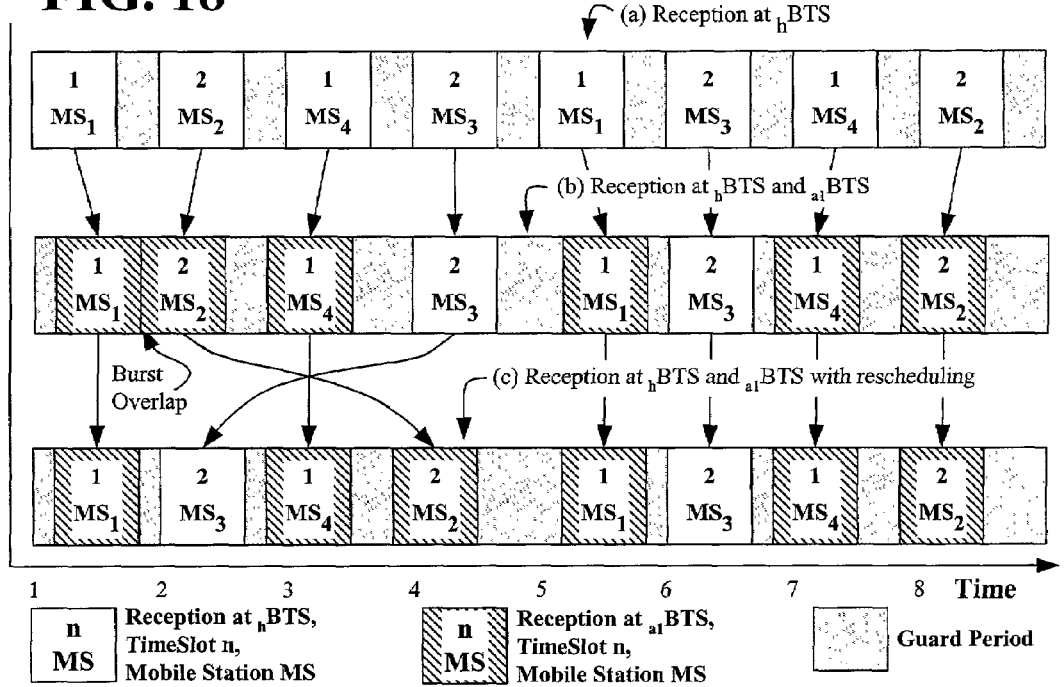

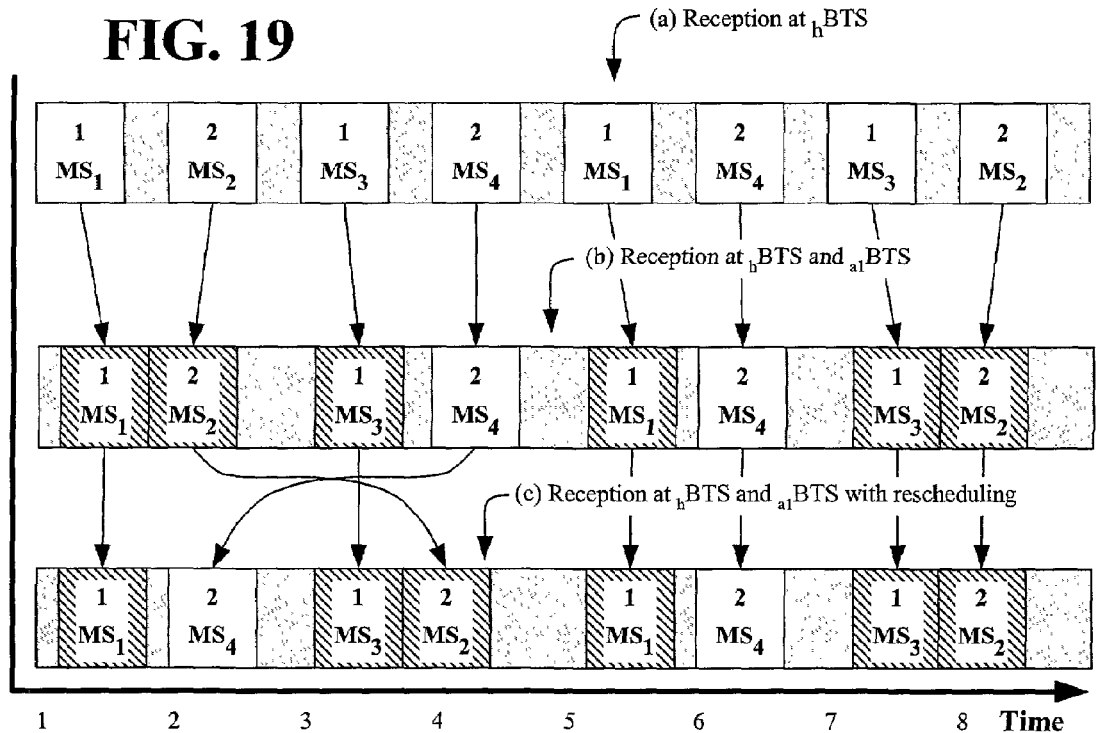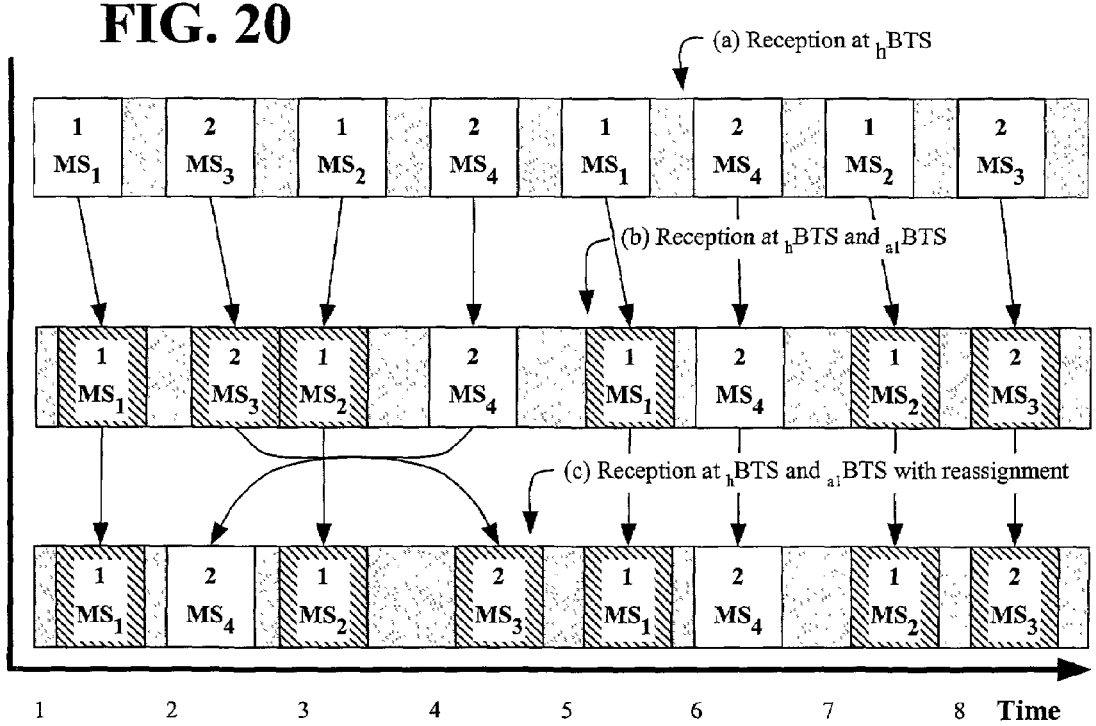

FAST MACRODIVERSITY SWITCHING WITH TIME MANAGEMENT IN WIRELESS NETWORKS

CROSS REFERENCE

This application is a continuation-in-part of the application entitled SYSTEM FOR FAST MACRODIVERSITY SWITCHING IN MOBILE WIRELESS NETWORKS, SC/Ser No 09/750,592 invented by Bhupal Kanaiyalal Dharia, Gopal Chillariga, Ujjal Kumar Ghoshtagore, Rohit Kaushal, Gerhard Albert Koepf and Lance Kazumi Uyehara, filed Dec. 28, 2000.

BACKGROUND OF THE INVENTION

Conventional Cellular Systems. The present day cellular mobile telephone system developed due to a large demand for mobile services that could not be satisfied by earlier systems. The cellular system "reuses" frequency within a system of cells to provide wireless two-way radio frequency (RF) communication to large numbers of users. Each cell covers a small geographic area and collectively an array of adjacent cells covers a larger geographic region. Each cell has a dedicated fraction of the total amount of RF spectrum which is used to support cellular users located in the cell. Cells are of different sizes (for example, macro-cell or micro-cell) and are generally fixed in capacity. The actual shapes and sizes of cells are complex fimctions of the terrain, the man-made environment, the quality of communication and the user capacity required. Cells are connected to each other via land lines or microwave links and to the public-switched telephone network (PSTN) through telephone switches that are adapted for mobile communication. The switches provide for the hand-off of users from cell to cell and thus from frequency to frequency as mobile users move between cells.

In conventional cellular systems, each cell has abase station with RF transmitters and RF receivers co-sited for transmitting and receiving communications to and from cellular users in the cell. The base station employs forward RF frequency bands (carriers) to transmit forward channel communications to users and employs reverse RF carriers to receive reverse channel communications from users in the cell. Conventional forward channel communications are static in that they employ fixed power, at fixed frequencies and have fixed sectors if sectorized antennas are used.

The forward and reverse channel communications use separate frequency bands so that simultaneous transmissions in both directions are possible. This operation is referred to as frequency domain duplex (FDD) signaling. Although time domain duplex (TDD) signaling, in which the forward and reverse channels take turns using the same frequency band is possible, such operation is not part of any widespread current cellular implementation.

The base station in addition to providing RF connectivity to users also provides connectivity to a Mobile Telephone Switching Office (MTSO). In a typical cellular system, one or more MTSO's will be used over the coverage region. Each MTSO can service a number of base stations and associated cells in the cellular system and supports switching operations for routing calls between other systems (such as the PSTN) and the cellular system or for routing calls within the cellular system.

Base stations are typically controlled from the MTSO by means of a Base Station Controller (BSC). The BSC assigns RF carriers to support calls, coordinates the handoff(handover) of mobile stations (users) between base stations, and monitors and reports on the status of base stations. The number of base stations controlled by a single MTSO depends upon the traffic at each base station, the cost of interconnection between the MTSO and the base stations, the topology of the service area and other similar factors.

A handoff between base stations occurs, for example, when a mobile user travels from a first cell to an adjacent second cell. Handoffs also occur to relieve the load on a base station that has exhausted its traffic-carrying capacity or where poor quality communication is occurring. The handoff is a communication transfer for a particular user from the base station for the first cell to the base station for the second cell. During the handoff in conventional cellular systems, there is a transfer period of time during which the forward and reverse communications to the mobile user are severed with the base station for the first cell and are not yet established with the second cell. A typical conventional cellular system has the transfer period designed to be less than 100 milliseconds. Conventional cellular implementations employ one of several techniques to reuse RF bandwidth from cell to cell over the cellular domain. The power received from a radio signal diminishes as the distance between transmitter and receiver increases. All of the conventional frequency reuse techniques rely upon power fading to implement reuse plans. In a frequency division multiple access (FDMA) system, a communications channel consists of an assigned particular frequency and bandwidth (carrier) for continuous transmission. If a carrier is in use in a given cell, it can only be reused in cells sufficiently separated from the given cell so that the reuse site signals do not significantly interfere on the carrier in the given cell. The determination of how far away reuse sites must be and of what constitutes significant interference are implementation-specific details. The cellular Advanced Mobile Phone System (AMPS) currently in use in the United States employs FDMA communications between base stations and mobile cellular telephones.

In time division multiple access (TDMA) systems, multiple channels are defined using the same carrier. The separate channels each transmit discontinuously in bursts which are timed so as not to interfere with the other channels on that carrier. Typically, TDMA implementations also employ FDMA techniques. Carriers are reused from cell to cell in an FDMA scheme, and on each carrier, several channels are defined using TDMA methods.

In code division multiple access (CDMA) systems, multiple channels are defined using the same carrier and with simultaneous broadcasting. The transmissions employ coding schemes such that to a given channel on a given carrier, the power from all other channels on that carrier appears to be noise evenly distributed across the entire carrier bandwidth. One carrier may support many channels and carriers may be reused in every cell.

In space division multiple access (SDMA) systems, one carrier is reused several times over a cellular domain by use of adaptive or spot beam-forming antennas for either terrestrial or space-based transmitters.

TDMA Conventional Cellular Architectures. In TDMA systems, time is divided into time slots of a specified duration. Time slots are grouped into frames, and the homologous time slots in each frame are assigned to the same channel. It is common practice to refer to the set of homologous time slots over all frames as a time slot. Each logical channel is assigned a time slot or slots on a common carrier band. The radio transmissions carrying the communications over each logical channel are thus discontinuous. The radio transmitter is off during the time slots not allocated to it.

Each separate radio transmission, which should occupy a single time slot, is called a burst. Each TDMA implementation defines one or more burst structures. Typically, there are at least two burst structures, namely, a first one for the initial access and synchronization of a user to the system, and a second one for routine communications once a user has been synchronized. Strict timing must be maintained in TDMA systems to prevent the bursts comprising one logical channel from interfering with the bursts comprising other logical channels in the adjacent time slots. When bursts do not interfere, they are said to be isolated. Burst-to-burst isolation may be quantified in several ways. One measure is the minimum signal-to-interference ratio between the burst intended for a time slot and the bursts intended for the preceding and following time slots, said minimum ratio being taken over the information-carrying length of the burst in question. If this ratio never drops below an implementation-specific value, the burst is said to be isolated from the adjacent bursts. In the event that this safety margin is violated, another measure of isolation is the fraction of the total burst for which the margin is violated. This measure may be a weighted measure if the importance of data or the degree of coding protection afforded the data varies over the length of the burst. Data variation over the burst is typical in TDMA implementations.

The isolation of one burst from the preceding and following bursts is crucial for TDMA systems. The defined burst structures are constructed to assist in the isolation process. A burst theoretically cannot completely fill its allotted time slot because radio transmitters neither commence nor cease transmitting instantaneously. TDMA implementations therefore allow time for radio signal strength to ramp up and to ramp down in each of the defined burst structures. During normal communications to and from a synchronized user, each burst does not quite fill its specified time slot. A guard period, $T_G$, is inserted before and/or after each normal burst to allow for timing mismatches, multipath delays, and inaccuracies within the system. The initial synchronization bursts for accessing the system fill even less of a time slot than do normal bursts. The long guard period, $T_{LG}$, for synchronization bursts is used to overcome the timing mismatches caused by the unknown separation between a user and the base station.

Within a cell, the base station maintains a time base which users synchronize to during initial access. User synchronization to a particular base station is achieved using synchronization bursts sent periodically on a specific carrier by that base station and the reply synchronization bursts sent by the user. Those reply transmissions will arrive delayed at the given base station by the propagation time for radio signals over the separation between the user and the given base station. The separation is generally unknown because the users are mobile. Not only is a burst delayed, but in the cellular multipath environment, multiple copies of the burst are received over some delay spread corresponding to multipath reception over reflected paths of varying lengths. A digital signal processing technique known as equalization is commonly used in RF communications to correct for multipath delay spreading and fading. After equalization, the base station can measure a single skewing delay time for the user synchronization burst. The base station then commands the user to correct for this delay time by time advancing the user bursts by an equal time interval. Thus each individual user has a time base set by the base station to ensure that the transmissions from all users will arrive back at the base station in synchronization with the base station time base.

These burst structures are detailed for two typical conventional cellular TDMA implementations. Under the European-defined "Global system for mobile communications" (GSM) standard, which is substantially copied in the United States within the PCS 1900 standard, each RF carrier occupies 200 kHz of bandwidth. Each carrier is divided into time slots of 577 μs, organized into 8-slot frames lasting 4.615 ms. Each physical channel receives one time slot per frame, and a variety of logical channels maybe constructed on a physical channel. The digital coding scheme used in GSM has a bit length of 3.69 μs. A normal speech burst consists of 148 bits of information followed by 8.25 bit periods of guard time. Thus for GSM, the standard is $T_G$=8.25 bit periods=30.44 μs. The reverse channel synchronization (in GSM terminology, the random access) burst has 88 bits of signaling information followed by 68.25 bit periods of guard time. Thus for GSM, the $T_{LG}$=68.25 bit periods =252 μs.

Under the IS136 TDMA standard, each RF carrier occupies 30 kHz of bandwidth. Each carrier is divided into time slots of 6.67 ms, organized into 6-slot frames lasting 40 ms. Each logical channel receives two time slots per frame. The bit length for IS136 is 20.58 μs. A normal reverse channel burst consists of 6 guard bit periods, 6 ramp bit periods, and 312 bits of mixed control signaling and data. Thus for IS136, $T_G$=6 bit periods =123.48 μs. The reverse channel synchronization burst has a longer guard period of 38 bit periods, so that $T_{LG}$=38 bit periods =782.0 μs for IS136

The $T_G$ and $T_{LG}$ are principally used to counteract the effects of propagation path travel time and delay spread. These effects are collectively referred to as user time skew. Given the speed of light as approximately $3\times10^8$ m/s, the maximum path lengths, $D_G$ and $D_{LG}$, are derived for which the guard periods will compensate for the user time skew. For GSM, $T_G$=30.44 μs so that $D_G$=9.13 km. Similarly, $T_{LG}$=252 μs so that $D_{LG}$=75.6 km. For IS136, $T_G$=123.48 μs, $D_G$=37.5 km, $T_{LG}$=782.0 μs, and $D_{LG}$=234.6 km. As an additional constraint for GSM, the maximum timing advance which can be commanded for a user is 64 bit periods=236.2 μs, which equates to 70.85 km. Both the GSM and IS136 TDMA cellular implementations use equalization and convolutional coding to correct for multipath delay spreading of a burst. However, if delayed versions of a burst arrive more than $T_G$ late, they may interfere with the burst from another source intended to arrive in the following slot. Typically, signals arriving on paths many microseconds longer than the shortest path, which is the straight-line path, are received with much lower strength than the earlier signals, and the burst-to-burst interference is thus tolerable in some circumstances.

In general for all current TDMA implementations, a maximum cell radius exists beyond which it is not possible to synchronize users. The maximum synchronization radius, $R_{synch-max}$ is found by dividing $D_{LG}$ by 2, since the delay found for the initial synchronization burst is equal to the round-trip travel time from the base station to the user and back. For longer travel time, the initial synchronization bursts are not completed prior to the end of the time slot in which they are to be received, and the system will not recognize the communication as a request for synchronization Thus $R_{synch-max}$=35.4 km for GSM implementations and $R_{synch-max}$=117.3 km for IS136 implementations. These distances define the cell sizes. If larger cells are desired, then channel assignment schemes which leave empty time slots between all pairs of time slots in use can be employed, but such operation is at the expense of capacity.

In a mobile wireless network, mobile stations (MS) are typically in communications with one base transceiver station (BTS) through up and down radio links. Such ground-based radio links suffer from strong local variations in path loss mainly due to obstructions and line-of-sight attenuation. As MS move from one point to another, their signal path losses go through shadow fading fluctuations that are determined, among other things, by the physical dimension of the obstructions, antenna heights and MS velocity. These variations in path loss, must be taken into account in the design of the uplink and downlink radio link resource allocation.

While communicating with a specific host BTS, MSs are frequently within the communications range of other BTSs. Statistically, due to the distribution of physical obstructions, the shadow fading path loss fluctuations to such other BTS tend to be only weakly correlated with the path loss fluctuations on the link between the MS to host BTS link. It is therefore possible that a MS, at anyone time and location, has a lower path loss to a different BTS than the one with which it is communicating.

In a conventional wireless network using the GSM standard, the base station controller (BSC) manages the radio link resources of the BTS. These resources are determined by the number of transceivers installed at the BTS and the number of radio channels anyone transceiver can handle. For example, in TDMA standards, a radio channel consists of a frequency and a time slot. In CDMA standards, a radio channel is represented by a frequency and one of a number of orthogonal spreading codes.

ABTS has two principal functions, that of controlling the radio links with all MSs within its cell, and relaying traffic between the BSC and the MSs. Relaying traffic includes receiving downlink traffic from the BSC and broadcasting it to MSs using broadcasters and that of receiving uplink traffic from the MSs using radio receivers called collectors and relaying it to the BSC.

In a mobile wireless network with a BSC, the BSC controls the assignment of the radio link resources (including Broadcasters and Collectors) in the BTSs as well as the operation of the network, and through the MSC, provides an interface with the Public Switched Telephone Network (PSTN). For generality, the BTS broadcasting and collecting functions can be considered as separate entities. In most existing networks, however, broadcasters (B) and collectors (C) are co-located.

In one example, three base transceiver stations (13TS) include three broadcasters and three collectors where broadcasters and collectors are typically but not necessarily co-located. The broadcasters and collectors have downlinks and uplinks to the BSC. These links are typically cabled links such as T1/E1 lines. The connection of these links between the broadcasters or collectors with the BSC may be arranged in various configurations such as a star pattern, a daisy-chain pattern or in any combination of these or other patterns.

When a connection is setup between a MS and the mobile network, a BSC selects the BTS that has the best radio access to the MS. This setup process includes a series of signal transmissions back and forth between the BSC, the BTSs, and the MSs using uplink and downlink radio control channels. The setup process results in the assignment of dedicated radio traffic and control channels for the uplinks and downlinks for communications between the MSs and the BTSs. Once these connections are set-up, user traffic, also called payload, can be transmitted between the MSs and the BSC. While the connection lasts, the BTS/BSC controls the operation of the radio traffic channels, including power control, frequency hopping, and timing advance. Also, the BTS/BSC continues to use the radio broadcast channels for operation, maintenance and signaling with all other MSs in its cell.

Users (MSs) communicate with collectors via control uplinks and traffic uplinks and with broadcasters via control downlinks and traffic downlinks. A particular broadcaster and collector is called the host broadcaster and the host collector for a particular MS. Together, they perform the function of the host BTS for the particular MS.

As MSs move within a cell and as the average path loss between an MS and its serving broadcaster and collector degrades, existing networks reassign the MS to another BTS (with a broadcaster and collector) that has a lower path loss. This process is called handover or handoff.

In wireless networks, dedicated radio links serve individual MSs and are at times operated at lower power levels. For instance, MSs close to a BTS do not require large transmit power levels and are operated at the minimum level meeting the link quality requirements. The reason for reducing power is to conserve radio band resources to enable reuse of radio resources in as many cells in the network as possible. MSs sharing uplink radio resources generate co-channel interference at their respective BTSs and BTSs sharing downlink radio resources generate co-channel interference at MSs.

Shadow fading imposes large fluctuations on the path loss between a particular MS moving in a cell and its serving BTS. At times when the path loss to a BTS is high, a high transmit power is used to maintain the quality of service. At such times, it is likely that the path loss between the particular MS and another BTS is lower because shadow fading effects between a MS and different BTSs are not highly correlated. Therefore, such other BTS can communicate traffic and/or control signals with the particular MS using lower uplink and downlink power levels. By switching the traffic and/or control channel over to such other BTS, the contribution of the particular radio link to the interference level in the network for other MS-BTS links that use the same radio resources is reduced. When such switching is implemented for many radio links in a network, a larger number of links can be operated in the network increasing network capacity without adding radio bandwidth.

The above-identified, cross-referenced application entitled SYSTEM FOR FAST MACRODIVERSITY SWITCHING IN MOBILE WIRELESS NETWORKS takes advantage of the de-correlation of shadow fading effects using fast macrodiversity switching (FMS) to select a BTS with the lowest instantaneous path loss for communicating uplink and downlink channels to a particular MS. In operation, host and assistant BTSs are employed. The host BTS remains in control of the particular MS via its broadcast channel until a handover is carried out. The dedicated channels with the particular MS are routed originally through the host BTS. When another BTS with a lower path loss becomes available, traffic and control channels are routed through such other BTS, which is designated as the assistant BTS for particular channels. As an MS moves through the cell, and as its path and shadow-fading losses change, the dedicated channels are switched among a number of BTSs in the network, including the host BTS. This fast macrodiversity switching continues unless the path loss between the particular MS and the host BTS becomes too high and a handover of the broadcast and dedicated channels is executed.

In the fast macrodiversity switching (FMS) process described, the radio resource used for a broadcast channel (frequency, time slot, code) for the host BTS is not changed while the dedicated channels are switched. The FMS process therefore differs from the handover process. Specifically, in the handover process, both the broadcast and dedicated channels are switched from radio resources assigned to the old BTS to radio resources assigned to the new BTS in accordance with a frequency reuse plan. By way of contrast in the FMS process, the broadcast channel is not switched while the dedicated channels are switched. The term "fast" is used to mean operations that are faster than the operations that are possible in a native protocol. For example, where the native protocol is GSM, the time scale of the FMS switching process is fast relative to switching for a handover. Fast macrodiversity switching operates, for example, at switching speeds of less than one second and in the range of 0.02 seconds to 0.25 seconds in a GSM embodiment. The FMS process can be done without modification to standard MS operation and also without changing the signaling to a MS.

In an FMS environment where timing advance is present, the combination of timing advance and fast macrodiversity switching causes portions of transmission to overlap and cause interference. When time advanced data is switched, the timing advance process is disturbed and will not operate, if at all, in the normal manner.

The European Telecommunications Standards Institute (ETSI) has defined a number of new GSM wireless data services. A GSM data call service at 14.4 kbits/sec per time slot is 50 percent higher than the standard 9.6 kbits/sec call service. A High Speed Circuit Switched Data (HSCSD) service aggregates several symmetric or asymmetric circuit channels at speeds of 28.8 kbits/sec when using two time slots (2+2) and 43.2 kbits/sec when using three time slots (3+1). Further extensions enable speeds of 56 kbits/sec, symmetrically (4+4) and asymmetrically (4+1). A General Packet Radio Service (GPRS) provides packet radio access to external Packet Data Networks such as the Internet. High spectrum efficiency is achieved by sharing time slots between different users with data rates of over 100 kbits/sec to a single user and a very low call set-up time. It offers direct IP connectivity, in a point-to-point or point-to-multipoint mode. An Enhanced Data Rate for GSM Evolution (EDGE) service modifies the modulation scheme used on the radio link from Gaussian Minimum Shift-Keying (GMSK)to Quadrature Amplitude Modulation (QAM). EDGE includes packet based technology E-GPRS (E-General Packet Radio Service) and circuit switched E-CSD (E-Circuit Switched Data) technology. Throughput is three times higher compared to standard GSM while using the same bandwidth. EDGE, has the potential of delivering data rates of over 300 kbits/sec to a single user.

The new services and technologies when employed with fast macrodiversity switching compound timing management problems. The problems include uplink burst overlap at the receiver of a BTS; downlink burst overlap at the transmitter of a BTS; interference due to burst overlap; shifting of slot receive boundaries at the BTS and at the MS and destruction of tail bits used for channel estimation. In (E)GPRS, the sharing of resources (time slots) between MS's, the need for scheduling and the need for resource allocation present difficulties that are further compound management requirements when fast macrodiversity is present.

Accordingly, there is a need for improved processing that permits fast macrodiversity switching in an environment of timing advance that helps achieve the objectives of improved performance and higher density of MSs.

SUMMARY

The present invention is a communication system for communication using wireless signals in a fast macrodiversity switching environment. The wireless signals include downlink signals to and uplink signals from mobile stations where the wireless signals have bursts in time slots. A plurality of transceiver stations have broadcast channels (non-switched) and dedicated channels (switched) for the wireless signals. A base station controller, or other system timing control, establishes the initial timing of bursts, including their initial timing advances, and establishes initial guard bands between bursts. Zone manager means thereafter controls the fast macrodiversity switching of dedicated channels among transceiver stations.

The zone manager means includes switching processing means providing switching information for identifying candidate ones of said transceiver stations available to be used to service dedicated channels for the mobile stations. The zone manager means includes a fast macrodiversity switching control for dynamically switching among selected ones of the transceiver stations to provide dedicated channels for the mobile stations. The fast macrodiversity switching has the potential for causing the bursts to have time shifts that are of a magnitude to cause unwanted burst overlap. The zone manager means includes a macrodiversity timing control that controls the timing of bursts, to reduce burst overlap, in dedicated channels that have been dynamically switched.

The zone manager means is either centralized or distributed as a matter of design choice. The zone manager means, in a distributed embodiment, is formed of discreet and macrodiverse zone managers that are distributed at macrodiverse BTSs. Each transceiver station and its channels includes or is otherwise associated with a zone manager where a host transceiver station has its zone manager designated as a host zone manager and other transceiver stations (assistant BTSs) have their zone managers designated as assistant zone managers. The uplink and downlink signals communicate with timing adjustments that vary as a function of the MS location relative to the serving base stations.

The control by the host and assistant zone managers includes switching downlink signals to and uplink signals from mobile stations among base transceiver stations which include broadcast channels (non-switched) and dedicated (switched) channels. Zone managers determine candidate ones of the transceiver stations for particular dedicated channels for a particular mobile station. Candidate ones of the transceiver stations are dynamically selected to provide the dedicated channels for the mobile stations separately from the transceiver stations providing broadcast channels for the mobile stations. The dedicated channels are switched as frequently as a signal change time which can be the frame rate of the uplink signals. The change time is typically less than one second for mobile stations in a GSM system.

A number of embodiments of zone managers with fast macrodiversity timing management are employed to avoid or reduce burst overlap problems created in an environment employing fast macrodiversity switching of dedicated channels.

In one embodiment, optimum uplink fast timing adjustments are applied at the transmitters (TX) of the mobile stations (MSs) so as to obtain synchronization of the uplink bursts at the receiving base stations.

In another embodiment, optimum uplink fast timing adjustments for uplink bursts received at the BTS are applied by shifting the expected time of arrival window for time slots.

In one embodiment, the time offsets for the mobile stations are selected to be sub-optimal for some of the transceiver stations so as to mitigate burst overlap problems caused by switching to other of the transceiver stations. For example, where a plurality of candidate transceiver stations are present for serving dedicated channels, the candidate transceiver stations have candidate timing advances for use in serving each of the mobile stations, the timing offsets determined for the mobile stations use an average of the candidate timing advances. The average is in some embodiments a weighted average that is weighted based upon the probabilities of selecting the candidate transceiver stations as the serving transceiver station.

In some embodiments, bursts are scheduled in time slots where bursts from the mobile stations are received as a sequence of bursts having an initial sequence order such that the switching has the potential for causing burst overlap between bursts if the initial sequence order is retained. The macrodiversity timing control reschedules the sequence of bursts to have a rescheduled sequence order that reduces the burst overlap. In one embodiment, the rescheduled sequence order is based upon grouping bursts where, for example, the groups are periodically reformed in response to each instance of the dynamic switching. In some embodiments, bursts are assigned in time slots for each of the mobile stations whereby the bursts would be received in time slots with an initial time slot sequence order that upon being switched has the potential for causing burst overlap. The macro-diversity timing control reassigns the time slots to a reassigned time slot sequence order that reduces the burst overlap. In one embodiment, the reassigned time slot sequence order is based upon the grouping of bursts. In some embodiments, the groups are periodically reformed. In one embodiment, the groups are reformed in response to each instance of dynamic switching.

In some embodiments, the macrodiversity timing control operates with an update procedure having an execution time, $T_E$, where, for example, the update procedure is initiated by the zone manager whenever a dynamic switch occurs but where updates are inhibited whenever the execution time, $T_E$, is small compared with the time since the last update procedure was initiated.

The foregoing and other objects, features and advantages of the invention will be apparent from the following detailed description in conjunction with the drawings.

BRIEF DESCRIPTION OF THE DRAWINGS

FIG. 9 depicts schematic uplink bursts transmitted by MSs for uplink operation of mobile stations without timing advances.

FIG. 10 depicts schematic burst sequences received at the $_hBTS$ as a result of the transmissions of FIG. 9 for uplink operation of mobile stations without uplink timing advances.

FIG. 11 depicts schematic uplink bursts transmitted by the same MSs of FIG. 9 for uplink operation of mobile stations with uplink timing advances.

FIG. 12 depicts schematic uplink burst sequences received at the $_hBTS$ as a result of the transmissions of FIG. 11 from mobile stations with timing advances.

FIG. 13 depicts schematic burst sequences received at the $_{a1}BTS$ as a result of the transmissions of FIG. 12 for uplink operation of mobile stations without uplink fast timing advances.

FIG. 14 depicts schematic uplink bursts transmitted by the same MSs of FIG. 11 for uplink operation of mobile stations with uplink fast timing adjustments.

FIG. 15 depicts schematic uplink burst sequences received at the $_{a1}BTS$ as a result of transmissions from mobile stations of FIG. 14 after fast macrodiversity switching of dedicated channels with uplink fast timing adjustment.

FIG. 16 depicts a schematic representation of the FIG. 11 uplink burst sequences received at the $_{a1}BTS$ where the receiver in the $_{a1}BTS$ has the expected time of arrival windows shifted for time slots TS0, TS1 and TS2 to compensate for the time delays caused by fast macrodiversity switching.

FIG. 17 depicts schematic downlink bursts transmitted at the $_hBTS$ and schematic downlink bursts transmitted at the $_{a1}BTS$ and the same bursts received at the M1 mobile station.

FIG. 18 depicts a schematic representation of packet scheduling burst sequences.

FIG. 19 depicts a schematic representation of packet scheduling burst sequences that are ineffective.

FIG. 20 depicts a schematic representation of reassignment of resources for burst sequences.

DETAILED DESCRIPTION

Figure 1:
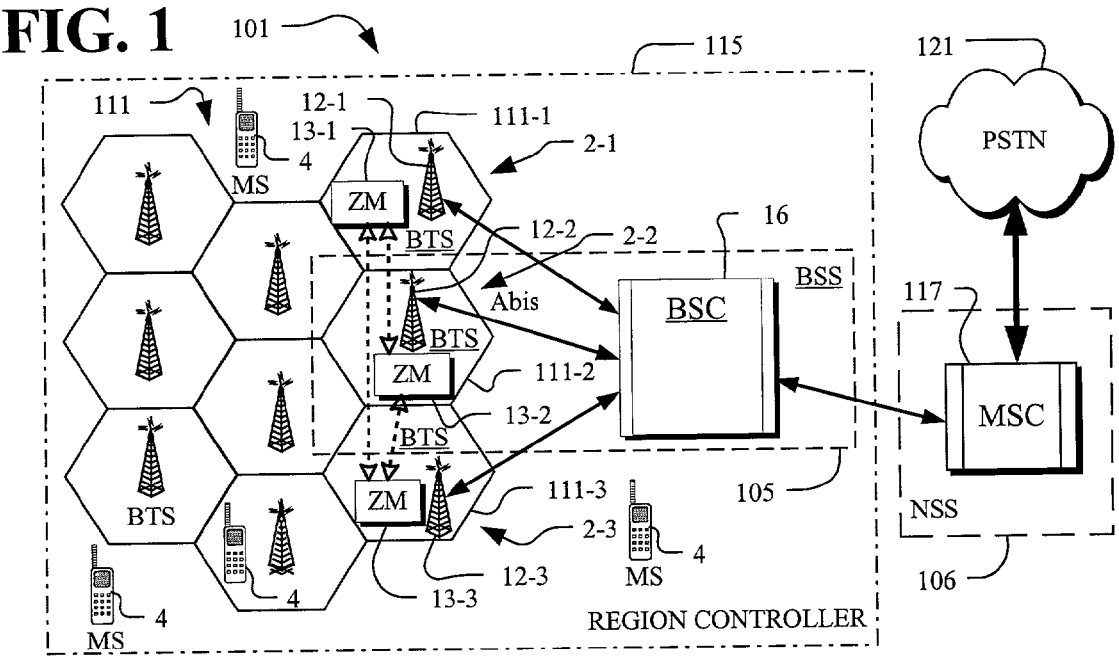
FIG. 1 depicts a wireless network formed of multiple base transceiver stations (BTSs) and multiple associated zone managers (ZMs) having fast macrodiversity switching of channels.

FIG. 1 depicts a wireless network 101 formed of multiple base stations (BSs) 2, including BS 2-1, 2-2 and 2-3, and multiple associated zone managers (ZMs) 13, including zone managers 13-1, 13-2 and 13-3. In FIG. 1, the mobile wireless network 101 includes the base transceiver stations (BTS) 12, including the BTS 12-1, 12-2 and 12-3 as part of the base stations 2-1, 2-2 and 2-3, respectively, that have radio downlinks and radio uplinks to a base station controller (BSC) 16. These links are typically cabled links such as T1/E1 lines. The BSC 16 controls the assignment of the radio link resources and the operation of the network and has an interface through the mobile switching center (MSC) 117, with the Public Switched Telephone Network (PSTN) 121.

In FIG. 1, the base station controller (BSC) 16, is part of the base station system (BSS) 105. The base station controller 16 is an embodiment of a system timing control means for controlling the initial timing of bursts with initial timing advances that provide for initial guard bands between bursts. The BSC 16 communicates with the base transceiver stations (BTS) 12 within the cells 111 of the wireless network 101. The cells 111-1, 111-2 and 111-3 are shown in expanded detail to include the BTS 12-1, 12-2 and 12-3, respectively, and the associated and distributed zone managers (ZM) 13 including ZMs 13-1, 13-2 and 13-3, respectively. The ZMs 13-1, 13-2 and are interconnected to form a zone network that controls the macrodiversity switching of the channels among the BTSs 12. The zone network interconnecting the zone managers 13 can be in any form including mesh, daisy-chain, star or otherwise.

In FIG. 1, the MSs 4 are mobile within the cell region 111 and can move, for example, among the cells 111-1, 111-2 and 111-3. As MSs 4 move in the region 111, the ZMs 13 operate to implement the fast macrodiversity switching of the channels. In FIG. 1, the control functions of the BSC 16, the BTS 12 and the ZM 13 collectively are part of a region controller 115 which controls the operation of the wireless network 101. In FIG. 1, the MSC 117, part of a network and switching subsystem (NSS) 106, connects to the PSTN 121.

In the wireless mobile network 111 of FIG. 1, when a connection to a BTS is setup for a MS, the BSC selects the BTS that has the best radio access to the MS as the host BTS. This setup process includes a series of signal transmissions back and forth between the BSC, the BTSs, and the MS using uplink and downlink radio control channels, and results in the assignment of dedicated radio traffic and control channels for the uplink and downlink between the MS and the BTS. Once this connection is set-up, user traffic is transmitted between the MS and the BSC. While the connection lasts, the BTS/BSC controls the operation of the radio traffic channels, including power control, frequency hopping, and timing advance on dedicated control channels, while it continues to use the radio broadcast channel for operation, maintenance and signaling with all the other MSs in the cell.

In the wireless mobile network 111 of FIG. 1, broadcast channels and dedicated channels are separate. Dedicated channels include control and traffic channels specific to an MS. Broadcast channels are used for signaling and control messages shared by all MSs within the cell, including MSs that are not in use. Broadcast and dedicated channels are carried over radio links. Traffic channels are used to transport user signals, also called payload, which can be voice or data. To ensure that all MSs within the cell have access to the control signals, the radio link for the broadcast channel is designed to be very reliable by using robust coding and modulation techniques and a high transmit power level.

In the fast macrodiversity switching operation of FIG. 1, it is assumed for purposes of explanation that BTS 12-1 and ZM 13-1 form the host base station (BS) 2-1 for some particular MS. It is also assumed that BS 2-2 and BS 2-3 are assistant BSs available to transmit and receive channels on a radio resource assigned to the host BS 2-1. Since every BS (including a BTS and a ZM) in the network can be both a host BS for some MSs and an assistant BS for other MSs, each such BS preferably has collector and broadcaster resources that can be tuned to any frequency and time slot available in the network.

In some embodiments, additional broadcaster and collector resources are installed in BTSs over what normally are used in the BTSs. These additional resources can be solely dedicated to perform the assistant BS fast macrodiversity switching functions under the control of a zone manager (ZM) 13. In some embodiments, the use of the original radio resources in the BTS are controlled by the BSC. In other embodiments, the original broadcasters and collectors of a BTS and any additionally installed broadcasters and collectors form a common radio resource pool. In this common pool implementation, all resources in the pool maybe used to perform the host and the assistant BTS functions. This common pooling implementation makes better use of the available transceiver (broadcaster and collector) resources. Control of this resource pool maybe with the BSC 16 for the host BTS function and with the ZMs for the assistant BTS functions, or control of all resources may be with either the BSC 16 or the ZMs 13.

Figure 2:
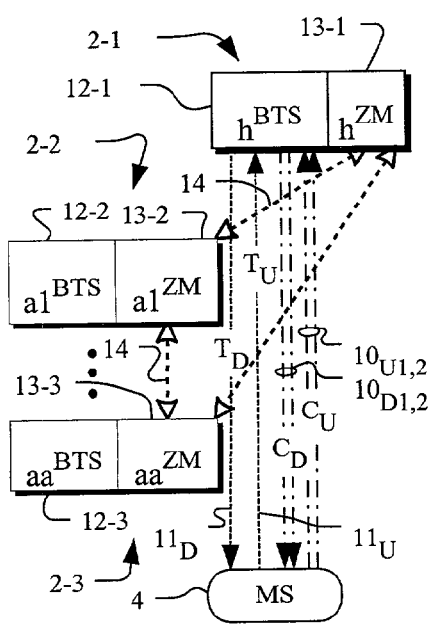
FIG. 2 depicts a wireless network formed of multiple base transceiver stations (BTSs) and multiple zone managers (ZMs) where traffic and control communications for fast macrodiversity switching for a typical MS are between a host BTS and assistant BTSs and under control of a host zone manager and assistant zone managers.

In FIG. 2, the host BTS ($_h$BTS) 12-1 and the corresponding host ZM ($_h$ZM) 13-1 form the host base station ($_h$BS) 2-1 for the particular one MS 4 shown in FIG. 2. The host $_h$BTS 12-1 and the MS 4, in the instance of FIG. 2, operate with respect to channel assignments essentially as a standard GSM system. Communications between the $_h$BTS 12-1 and the MS 4 include the uplink traffic, $T_U$, on link 11$_U$ and downlink traffic, $T_D$, on link 11$_D$. The control channels include the downlink control, $C_D$, on link 10$_{D1,2}$, and the uplink control, $C_U$, on link 10$_{U1,2}$. The downlink control channel, $C_D$, has two components, a downlink broadcast control channel on link 10$_{D1}$ and a dedicated downlink control channel on link 10$_{D2}$. The uplink control channel, $C_U$, has two components, an uplink control channel on link 10$_{U1}$ and a dedicated uplink control channel on link 10$_{U2}$. Although MS 4 is under control of the host $_h$BTS 12-1, assistant BTSs, including a first assistant $_{a1}$BTS 12-2 and a second assistant $_{aa}$BTS 12-3, associated with the assistant zone managers $_{a1}$ZM 13-2 and $_{aa}$ZM 13-3, respectively, also are available for communications with MS 4. The $_h$ZM zone manager 13-1, $_{a1}$ZM zone manager 13-2 and $_{aa}$ZM zone manager 13-3 are interconnected via links 14 that form an Umbis network. The links 14 of the Umbis network include link 14$_{h/a1}$ between the $_h$ZM zone manager 13-1 and the $_{a1}$ZM zone manager 13-2, link 14$_{h/aa}$ between the $_h$ZM zone manager 13-1 and the $_{aa}$ZM zone manager 13-3, and the link 14$_{a1/aa}$ between the $_{a1}$ZM zone manager 13-2 and the $_{aa}$ZM zone manager 13-3.

Figure 3:
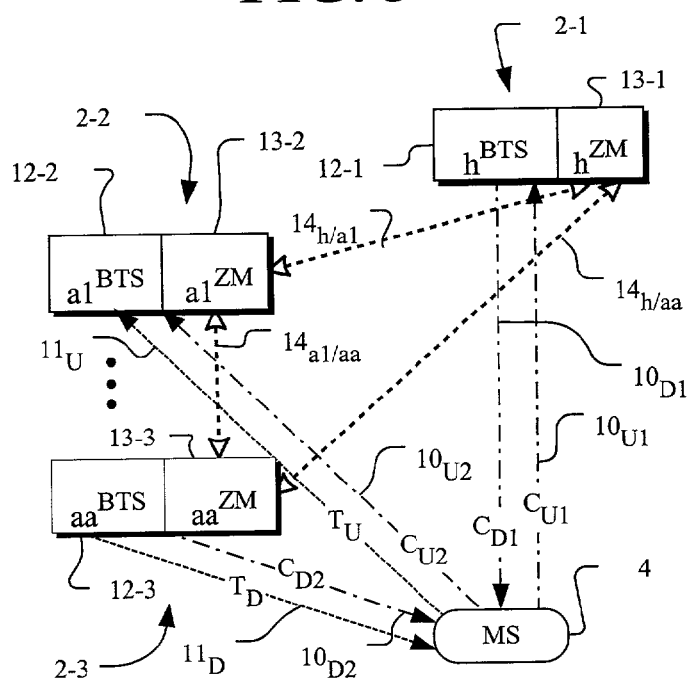
FIG. 3 depicts the wireless network of FIG. 2 where the traffic and control communications with fast macrodiversity switching for a typical MS have been switched among the host BTS and assistant BTSs of FIG. 2 under control of the host zone manager and assistant zone managers of FIG. 2.

In FIG. 3, the $_h$BTS 12-1 and the corresponding $_h$ZM 13-1 are the host BTS and the host ZM forming the host BS 2-1 for the MS 4. The relationship between the BTS 12-1 and the MS 4 of FIG. 3 is not like that for a standard GSM system. In FIG. 3, the traffic communication is on dedicated channels that have been switched to be between the assistant $_a$BTS 12-2 in the assistant BS 2-2 and the MS 4 for the uplink traffic, $T_U$, on link 11$_U$ and has been switched to assistant $_{aa}$BTS 12-3 in the assistant BS 2-2 for the downlink traffic, $T_D$, on link 11$_D$. One part of the control channels, the downlink control, $C_{D1}$ on link 10$_{D1}$, is a broadcast channel and that broadcast channel remains between host $_h$BTS 12-1 and MS 4. The other part of the control channels, dedicated downlink control, $C_{D2}$, on link 10$_{D2}$ and the uplink control, $C_{U2}$, on link 10$_{U2}$, are switched to the assistant $_{aa}$BTS 12-3 and $_{a1}$BTS 12-2, respectively. Although MS 4 is under control of the host $_h$BTS 12-1 via the downlink broadcast channel, the assistant BTSs including $_{a1}$BTS 12-2 and $_{aa}$BTS 12-3, associated with the assistant zone managers $_{a1}$ZM 13-2 and $_{aa}$ZM 13-3, directly carry the payload and the dedicated control channels with MS 4. The FIG. 3 embodiment demonstrates the switching of both traffic and control channels in the fast macrodiversity switching process.

In FIG. 3, the links 14 of the Umbis network include link 14$_{h/a1}$ between the $_h$ZM zone manager 13-1 and the $_{a1}$ZM zone manager 13-2, link 14$_{h/aa}$ between the $_h$ZM zone manager 13-1 and the $_{aa}$ZM zone manager 13-3, and the link 14$_{a1/aa}$ between the $_{a1}$ZM zone manager 13-2 and the $_{aa}$ZM zone manager 13-3. The links 14 form the macrodiversity switching network for controlling the fast switching of the dedicated channels among the $_h$BTS 12-1, $_{a1}$BTS 12-2 and $_{aa}$BTS 12-3. Any number of BTSs 12 and ZMs 13 can be included in the channel switching network of FIG. 3.

Figure 4:
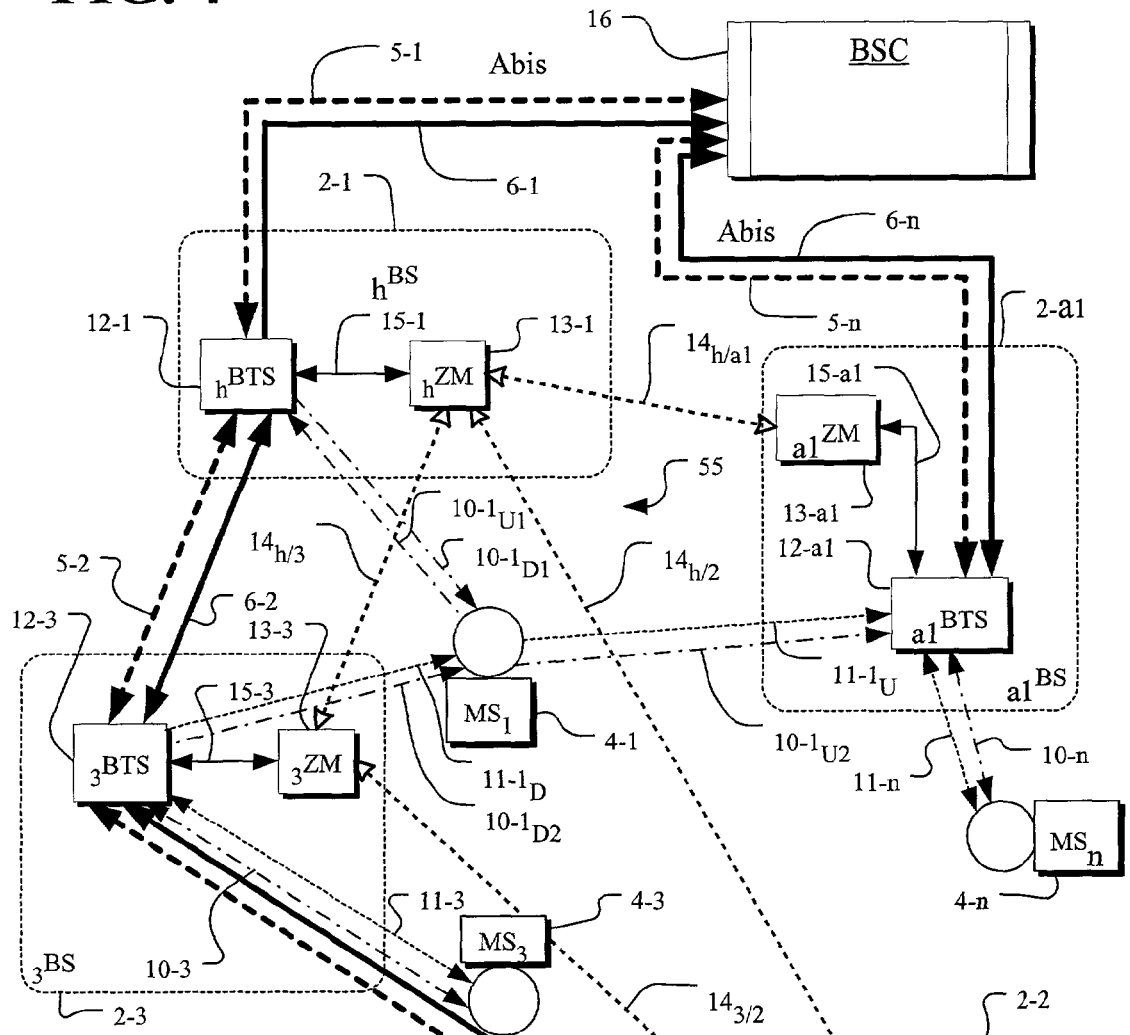
FIG. 4 depicts a further embodiment of the host/assistant wireless networks of FIG. 1 through FIG. 3 with host and assistant zone managers.

In FIG. 4, there are n users, MS 4, namely MS$_1$4-1, MS$_2$4-2, MS$_3$4-3, . . . , MS$_n$4-n. User MS$_1$ is shown communicating with $_h$BTS 12-1 in the host $_h$BS 2-1via control link 10-1 including downlink control 10-1$_{D1}$ and a control uplink 10-1$_{U1}$. The user MS$_1$, is communicating with a traffic uplink 11-1$_U$ and a control uplink 10-1$_{U1}$ to assistant $_{a1}$BTS 12-a1 and in base station 2-a1 with a traffic downlink 11-1$_D$ and control downlink 10-1$_{D2}$ to assistant $_3$BTS 12-3 in base station 2-3. The $_h$BTS 12-1 is the host BTS for MS$_1$. Similarly, user MS$_2$ communicates with $_{a1}$BTS in BS 2-2 via control and traffic links 10-2 and 11-2, respectively. The $_{a1}$BTS 12-2 is the host BTS for MS$_2$. User MS$_3$ 4-3 communicates with $_3$BTS 12-3 in BS 2-3 via control and traffic links 10-3 and 11-3, respectively. The $_3$BTS 12-3 is the host BTS for MS$_3$ and the $_{a1}$BTS and $_3$BTS are assistant BTS for user MS$_1$.

In FIG. 4, the BSC 16 communicates over an Abis interface, including the uplink and downlink control signals 5-1 and the uplink and downlink traffic signals 6-1, with the $_h$BTS 12-1 in base station 2-1. Similarly, the BSC 16 communicates over an Abis interface, including the uplink and downlink control signals 5-n and the uplink and downlink traffic signals 6-n connected to the $_{a1}$BTS zone manager 13-a1 in the $_{a1}$BS base station 2-a1.

In FIG. 4, the user MS$_1$ 4-1 communicates with its host $_h$BTS 12-1 which is part of the host base station ($_h$BS) 2-1. Also included in the host base station 2-1 is the zone manager $_h$ZM 13-1 which serves as the host zone manager for the user MS$_1$.

In FIG. 4, the base station $_{a1}$BS base station 2-a1 is an assistant for user MS$_1$ and includes the $_{a1}$ZM zone manager 13-a1 and the assistant $_{a1}$BTS 12-a1. The base station 2-a1 is the host base station for the user MS$_n$, and is an assistant base station for the base station 2-1 that is the host base station for the user MS$_1$ 4-1.

The entities that control the fast macrodiversity switching process are zone managers (ZMs) 13. In the FIG. 4 implementation, one ZM 13 is installed in each cell and is associated with a corresponding BTS 12 for that cell.

In FIG. 4 the zone managers $_h$ZM, $_2$ZM, $_3$ZM, . . . , $_{a1}$ZM form the zone manager network 55 for controlling the fast macrodiversity switching of the dedicated channels. In the embodiment of FIG. 4, zone manager $_h$ZM connects to zone manager $_3$ZM via the link 14$_{h/3}$, the zone manager $_h$ZM connects to the zone manager $_2$ZM via the link 14$_{h/2}$, the zone manager $_3$ZM connects to the zone manager $_2$ZM via the link 14$_{3/2}$ and the zone manager $_h$ZM connects to the zone manager $_{a1}$ZM via the link 14$_{h/a1}$. In some embodiments, the zone manager is separate from the BTS as shown in the base stations 2-1, 2-3 and 2-a1 of FIG. 4 with interfaces (Zbis) at 15-1, 15-3 and 15-a1 between the $_h$BTS and the $_h$ZM, between the $_3$BTS and the $_3$ZM and between the $_{a1}$BTS and the $_{a1}$ZM, respectively. In other embodiments, the ZM is in the Abis interface connection as shown in the $_2$BS base station 2-2. In still other embodiments, the ZM is fully integrated with the BTS. The particular implementation selected for the ZM is a matter of design choice.

In FIG. 4, broadcasters and collectors are included as a common entity in each BTS 12. In some wireless networks broadcasters and collectors for the same BTS are separated by macro-diverse distances and are therefore considered separately. The usual configuration where the uplink and downlink path losses typically are highly correlated has broadcasters and collectors co-located at the BTS.

FIG. 4 represents a snap shot of an fast macrodiversity switching implementation for one particular period of time. Any of the MSs, for example MS$_2$ or MS$_3$ can also communicate with different BTSs on their dedicated channels at any time. The FIG. 4 embodiment has distributed zone managers. In another embodiment, the zone manager function can be centralized and located, for example, in the BSC 16. As shown in FIG. 4, the zone manager may be integrated or connected with the BTS, or located on the Abis link.

Figure 5:
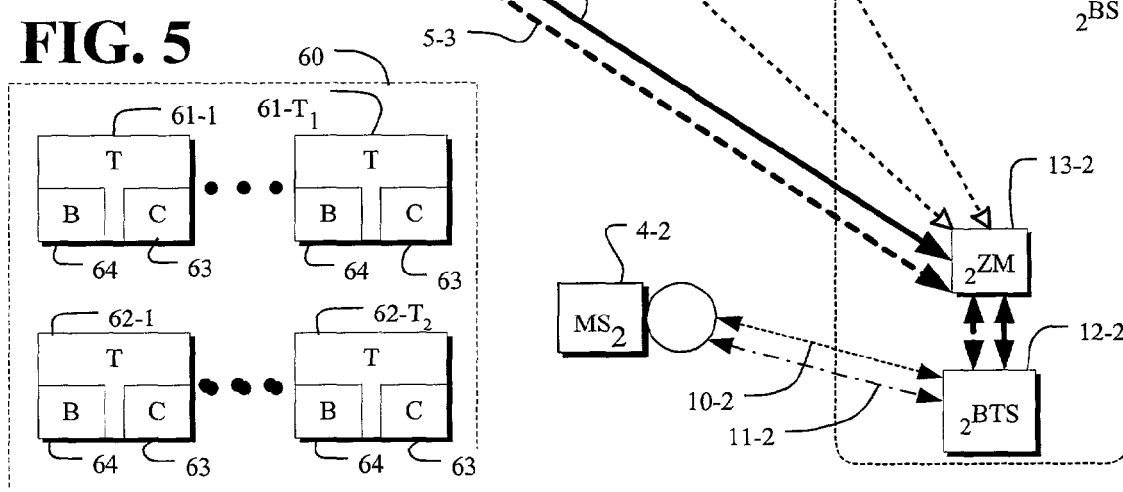
FIG. 5 depicts a representation of the transceivers which form a part of each of the base transceiver stations of FIG. 4.

FIG. 5 depicts a representation of the transceivers 60 which form a part of each of the base stations 2 of FIG. 4. In FIG. 5, the transceivers 61 and 62 each include a co-located broadcaster (B) and collector (C). The transceivers 61-1, . . . , 61-T$_1$ are the transceivers that are present in an ordinary GSM installation. The transceivers 62-1, . . . , 62-T$_2$ are the transceivers that are added in connection with fast macrodiversity switching. The transceivers 61 and 62 of FIG. 5 can be considered as a single pool allocated for any function in a base station 2 or can remain segregated so that the transceivers 61-1, . . . , 61-T$_1$ are allocated for ordinary base station operation and the transceiver 62-1, . . . , 62-T$_2$ are allocated by zone managers only for macrodiversity switching functions.

In some embodiments, receivers must be able to shift their receive windows depending on the effective receipt time of burst transmitted by MSs. Hence, the receivers of FIG. 5 must support variable uplink timing offsets in such embodiments.

In some embodiments, transmitters must be able to shift their transmit windows depending on the effective receipt time of bursts received by MSs. The effective receipt time is determined by the time difference of arrival between the $_h$BTS and the serving BTS. Hence, the transmitters of FIG. 5 support variable downlink timing offsets in such embodiments.

Figure 6:
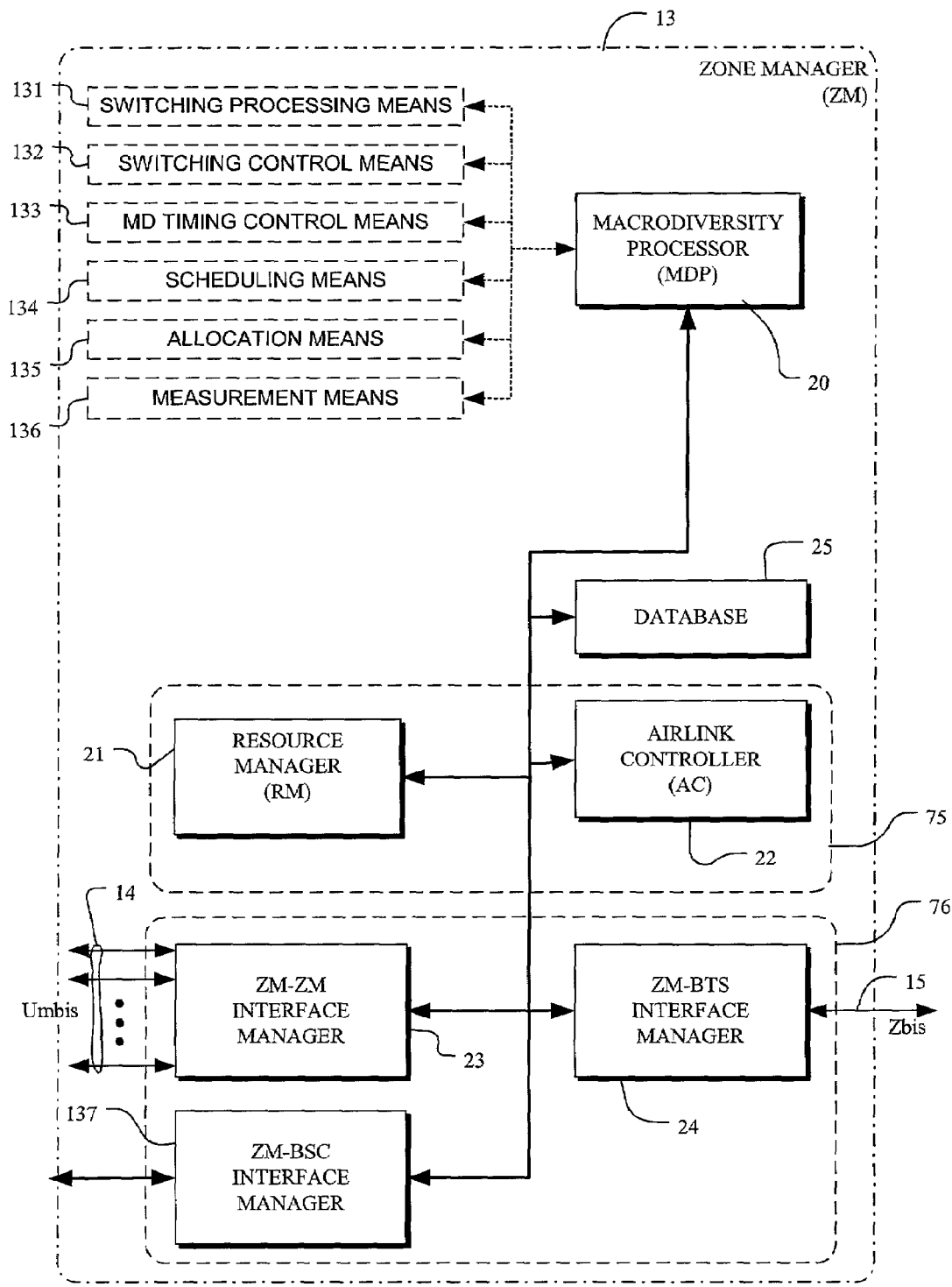
FIG. 6 depicts a schematic block diagram of a zone manager.

In FIG. 6, the basic components of a zone manager 13 are shown. The function of each ZM 13 is to enable fast macrodiversity switching in the mobile wireless network. The basic components of a zone manager 13 include a macrodiversity processor (MDP) 20, control means 75 including resource manager, (RM) 21 and airlink controller (AC) 22, and interface means 76 including ZM-ZM interface manager 23 for the ZM-to-ZM links 14 (Umbis interface) and ZM-BTS interface manager 24 for the BTS-to-ZM transceiver link 15 (Zbis interface). The control means 75 issues broadcaster commands for controlling the downlink signals to each of selected ones of mobile stations and collector commands for controlling the plurality of macro-diverse collectors for changing the uplink signals for each of other selected ones of the mobile stations. Similar to the roles of host and assistant BTS, a distinction is made between host ZM and assistant ZM. A host ZM controls the fast macrodiversity switching services to the set of MS within the cell of the host BTS. An assistant ZM 13 provides fast macrodiversity switching services to the host ZM 13 for the same set of MS. Therefore, the role of a particular ZM 13 depends on the location of MS in the network. Any ZM 13 is a host ZM for the particular MS controlled by the host BTS and an assistant ZM for all other MSs.

In FIG. 6, the macrodiversity processor (MDP) 20 is a processor for processing the measurement and control signals used in controlling the fast macrodiversity switching of dedicated channels. The resource manager (RM) 21 functions to keep track of and control all of the resources, including BTS broadcasters and collectors, available used and unused channels and links, and other resources in the wireless network needed for fast macrodiversity switching.

The airlink controller (AC) 22 is responsible for controlling the radio links among the BTSs and MSs via assistant ZMs and ZM-ZM links 14. The ZM-ZM interface manager 23 controls the ZM-to-ZM (Umbis) interface links 14 among zone managers 13 and supervises the zone manager network 55 of FIG. 4 for controlling the fast macrodiversity switching of dedicated channels. The ZM-BTS interface manager 24 functions to control the ZM-BTS link (Zbis) 15 between the ZM and BTS of a base station (BS).

The resource manager (RM) 21 within the ZM 13 controls the radio resources for fast macrodiversity switching services. In a typical BTS, a number of transceivers (see 61-1, . . . , 61-$T_1$ in FIG. 5) are installed to provide the radio links to an MS. In a BS 2 of FIG. 4, additional transceivers, called guest transceivers (see 61-1, . . . , 61-$T_2$ in FIG. 5) are installed. These guest transceivers provide the additional radio resources useful in implementing fast macrodiversity switching. In the basic implementation, as discussed above, radio resources provided by the guest transceivers are managed by the RM 21, while the allocation of the host transceiver radio resources remains under BSC 16 control. The RM 21 keeps track of all used and idle host and guest radio resources available in its host BS including the transceivers of FIG. 5. It receives radio link information, for example in the form of measurement reports and other information, either directly from its corresponding ZM or from other ZM in assistant BSs via the ZM-to-ZM links 14. Since the transceiver stations communicate over a region containing one or more zones and the measurements are received from one or more collectors in the transceiver stations, the measurements from collectors include radio link conditions between a mobile station and the one or more collectors where the radio link information incorporates radio link conditions such as path loss, forward error rates, and carrier-to-interference ratio. The RM 21 in the host ZM also tracks radio resource usage in all assistant BSs through communications with the RMs in the assisting BSs. The RM 21 in the host BS stores and updates this information in a radio resource data base (DB) 25. During installation, all RMs are initialized with the identity of those BTSs in the network that are candidates for becoming assistant BTSs and the specific radio resources available in these BTSs. Alternatively, the ZM's may communicate with each other to determine the identity of assistant BTSs both at setup time and periodically during operation. When the MDP 20 requests a radio resource, the RM 21 checks the priority level of the request and the availability (in location, frequency, time slot or spreading code) of a radio resource suited to meet the request as stored in DB 25. If no such resource is available, or if the priority level of the request is insufficient, the request is denied. Otherwise, the radio resource is released and the data base 25 is updated accordingly. The assignment of the radio resource is also communicated to the other RMs in other ZMs for updating their respective data bases.

To perform the fast macrodiversity switching function, the ZM uses algorithms to track information in real time and to provide resource contention resolution, for the host BS as well as for all assistant BS, for each MS. The ZM controls the outgoing information flow on the links 14 to other ZMs including the bandwidth resources of the links 14 between host BS and assistant BSs. The process of controlling the resources of the links 14 is analogous to the process of controlling the radio resources.

In one implementation, the host and guest transceivers form a pool of radio resources for assignment by both the ZM and the BSC, or by the ZM alone. In the latter case, the ZM is responsible for tracking and assigning radio resources for the host cell, both for normal traffic and for the fast macrodiversity switching service.

The MDP 20 provides several functions. One function of MDP 20 is to extract radio link quality measurements over the ZM-to-BTS data link for all the MSs in the host cell. These measurements are processed to determine when a need for fast macrodiversity switching services exists and what priority level is appropriate. Another function of the MDP 20 is to determine which of the assistant BTSs is best suited to provide the service. This function is done by transfer of measurements from the MDP 20 in one ZM 13 to other MDPs in the other ZMs. The MDP 20 then sends requests with a priority level for an appropriate radio resource and for link bandwidth to the RM 21. If the resource is available, the downlink traffic data is sent to the ZM-BTS interface manager 24 for transmission to the assistant BTS. Similarly, the AC 22 is instructed to make the radio resource available with configuration for fast macrodiversity switching. Similarly, on the uplink, the assistant BTS is instructed to receive uplink traffic from the MS on the identified radio link and to forward the traffic to the host BTS.

Another function of the MDP 20 is to monitor the control channels relayed by the host BTS. In the event of a MS or BSC originated handover, the MDP 20 may intervene with the handover process and continue fast macrodiversity switching services, or discontinue fast macrodiversity switching services with the MS 20 controlling the handover.

A further function of the MDP 20 is the control of the fast macrodiversity switching speed. Depending on the shadow fading statistics, as determined by the radio link measurements, the MDP 20 uses internal speed algorithms to optimize the fast macrodiversity switching speed.

Another function of the MDP 20, in some embodiments, is to provide aggregation services. These aggregation services are similar to fast macrodiversity switching functions and are performed using the ZMs. In aggregation, more than one transceiver is communicating with a particular MS. On the downlink, this operation consists of transmitting signals from more than one broadcaster to the particular MS using the same radio resource. This service is only possible with MSs that have the ability to receive the signals received separately and process the received signals to obtain a resulting downlink signal with a higher confidence level than any of the individual downlink signals. On the uplink, aggregation consists of receiving the particular MS signal in the collector of the host BTS, together with the MS signal with collectors located at assistant BTSs, transmitting these uplink signals to the MDP 20 in the host BTS via the ZM-to-ZM data links 14, and processing these signals to form a resulting uplink signal with a higher confidence level than any of the individual uplink signals.

The airlink controller (AC) 22 provides the ZM 13 with the ability to set certain parameters of the uplink and downlink radio links between a guest transceiver and a MS using macrodiversity services. By way of example, the AC 22 has the ability to determine and set transmit power settings. When a guest transceiver is assisting another BS to provide a radio link to a MS, the AC 22 informs the transceiver providing the radio resource for the fast macrodiversity switching service of the initial power level. Similarly, the AC is responsible for timing advance and for synchronizing the data transfer on the uplink and downlink during fast macrodiversity switching operations.

The ZM-to-ZM links 14 of FIG. 6 are used in fast macrodiversity switching. Referring to FIG. 1, a hierarchical control structure routes traffic between the PSTN 121 via a mobile switching center (MSC) 117 to an MS 4 through one of a number of BSCs (like BSC 16 in FIG. 1) and then through one of an even larger number of BTSs 12. With fast macrodiversity switching, however, uplink and downlink traffic is also routed between BTSs 12 through operation of the zone managers 13. In addition to routing traffic for fast macrodiversity switching services, the ZM-to-ZM links 14 are used in the control of the fast macrodiversity switching process. This fast macrodiversity switching control function is distributed among the ZMs. The data exchange between ZMs for providing each other with the measurement, resource and other information needed for fast macrodiversity switching services, is carried over the ZM-to-ZM links 14. The control of this information flow is managed by the RM 25 in each of the ZMs, but the formatting, organization of the data and the actual transmission is controlled by ZM-ZM interface mangers 23 in a zone manager at each end of a ZM-to-ZM link 14.

In FIG. 6, the ZM-ZM interface manager 23 provides latency control and bandwidth management across the ZM-to-ZM links 14. The ZM-ZM interface manager 23 also contributes to fast macrodiversity switching decision by monitoring the link utilization and quality of service over the ZM-to-ZM links 14.

The ZM-to-BTS link (Zbis) 15 is used to transport voice or data traffic, connection set-up information, control information (for MDP, RM, and AC functions) and fast macrodiversity switching traffic forwarded to other ZMs and BTSs. The control of this data flow in both directions is formatted and organized by the ZM-BTS interface managers in each zone manager.

In FIG. 6, the ZM-BSC interface manager 137 interfaces the zone manager 13 to the BSC 16 of FIG. 1 for coordination of burst scheduling and assignment functions. The burst scheduling and assignment for fast macrodiversity switching can be performed in the BSC 16 with input from the zone managers 13, can be performed in the zone managers 13 with input from the BSC 16 or can be shared between zone managers 13 and BSC 16.

The fast macrodiversity switching typically operates in an environment having features such as power control, frequency hopping, smart antennas and repeaters. In such environments, the additional benefit provided by fast macrodiversity switching results because each dedicated channel tends to operate using a radio link with the lowest available path loss for that dedicated channel. The fast macrodiversity switching makes it possible to reduce the MS and the BTS transmitter power levels. When implemented in an entire network, the lower power levels lead to a reduction in interference levels. Further, these reductions allow network operators to change the frequency reuse patterns and increase network capacity and/or throughput.

The zone manager 13 includes in combination a number of modules. The modules include a switching processing means 131 that provides signal information for identifying candidate ones of the transceiver stations to service dedicated channels for mobile stations. The modules include switching control means 132 that dynamically switches among candidate ones of the transceiver stations to provide the dedicated channels for the mobile stations where the switching has the potential for causing ones of the bursts to have time shifts. The modules include a macrodiversity (MD) timing control means 133 for controlling the timing of bursts to provide time adjustments that compensate for the time shifts and reduce overlap of bursts. The modules include a scheduling means 134 that schedules bursts in time slots. The modules include an allocation means 135 for assigning bursts to time slots. The modules include a measurement means 136 for measuring signal timing. The measurement means 136 is described in further detail in the application entitled SYSTEM FOR FAST MACRODIVERSITY SWITCHING IN MOBILE WIRELESS NETWORKS.

The switching processing means 131, switching control means 132, the MD timing control means 133, the scheduling means 134 and the allocation means 135 are each means that form part of the zone manager and that are implemented by computer code modules that execute functions relying on the other elements of the zone manager 13 and information stored in the data base 25. The information stored in the data base 25 for each MS includes Uplink Fast Timing Offset (UFTO), Downlink Fast Timing Offset (DFTO), Uplink Fast Timing Adjustment (UFTA), resource group information (for assisting scheduling and reassignment of bursts), degree of overlap of bursts for candidate base stations, different frequencies used for bursts and adjacent bursts (to enable assemble of overlapped tail bits) and similar information.

Figure 7:
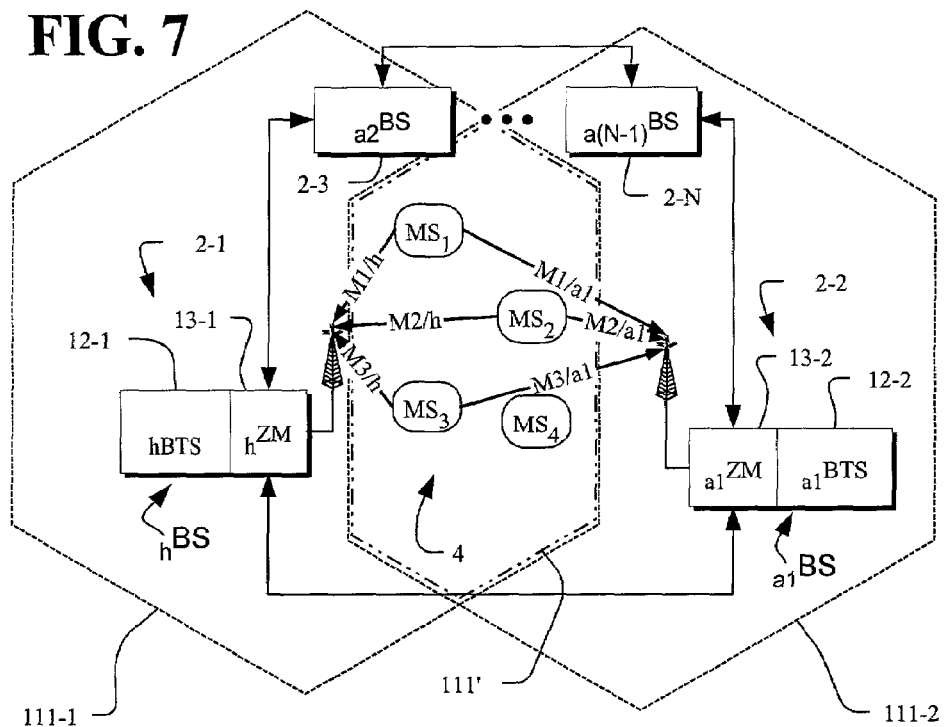
FIG. 7 depicts three typical mobile stations with uplink wireless communications with two base stations.

In FIG. 7, two overlapping wireless cells 111-1 and 111-2 are shown that are served by base stations 2-1, 2-2, 2-3..., 2-N. Base station 2-1, in examples described, functions as the host base station and includes the host $_h$BTS 12-1 and the host $_h$ZM 13-1. Base station 2-2, in examples described, functions as the assistant base station and includes the assistant $_{a1}$BTS 12-2 and the host $_{a1}$ZM 13-2. While base station 2-1, for purposes of explanation, has been designated as the host, the role of base station 2-1 for any particular one of the MSs maybe either a host or an assistant base station at any particular time. While base station 2-2, for purposes of explanation, has been designated as the assistant, the role of base station 2-2 for any particular one of the MSs may be either a host or an assistant base station at any particular time. Similarly, each of the base stations 2-3, ..., 2-N can be either a host or an assistant base station for any particular one of the MSs at any particular time. The two overlapping wireless cells 111-1 and 111-2 of FIG. 7 are representative of the many cells that may exist in the cell region 111 of FIG. 1. Although fast macrodiversity switching may occur for MSs anywhere in the cell region 111, such operation maybe more prevalent in some areas. For example, the area 111' which is the intersection of cells 111-1 and 111-2 can be considered the predominant macrodiversity zone where fast macrodiversity switching occurs. In full generality, however, the macrodiversity zone 111' is anywhere where MSs that participate in fast macrodiversity switching are located.

In FIG. 7, zone managers 13-1 and 13-2 are interconnected to function, among other things, as the manager to control the timing management during fast macrodiversity switching for users 4 (MSs)including $MS_1$, $MS_2$, $MS_3$ and $MS_4$. The users $MS_1$, $MS_2$, $MS_3$ and $MS_4$ are typical of the many users 4 that can be present in a wireless system.

The users $MS_1$, $MS_2$, $MS_3$ and $MS_4$ of FIG. 7 use time slots in communicating with the serving $_hBTS$ and the assistant $_{a1}BTS$. The communication from $MS_1$ occurs on an uplink channel M1/h to host base station 2-1. The communication from $MS_2$ occurs on an uplink channel M2/h to host base station 2-1. The communication from $MS_3$ occurs on an uplink channel M3/h to host base station 2-1. The communication from $MS_4$ occurs on an uplink channel M4/h (not explicitly shown) to host base station 2-1.

Figure 8:
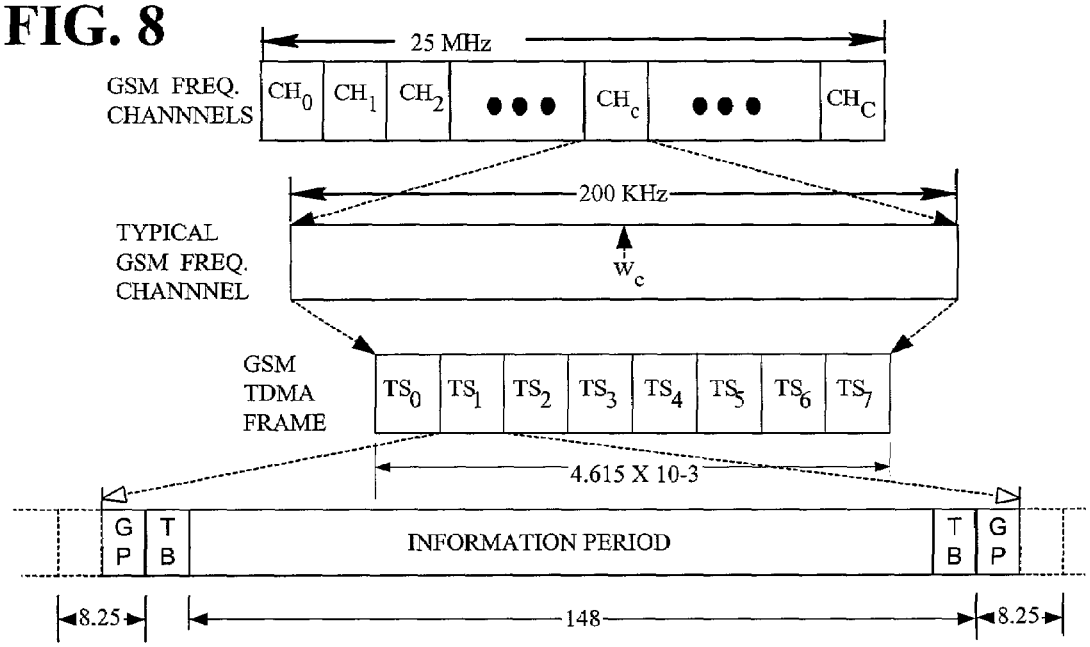
FIG. 8 depicts a representation of signal timing for operations in a GSM system.

The communication from $MS_1$ occurs on an uplink channel M1/a1 to host base station 2-1. The communication from $MS_2$ occurs on an uplink channel M2/a1 to host base station 2-1. The communication from $MS_3$ occurs on an uplink channel M3/a1 to host base station 2-2. The communication from $MS_4$ occurs on an uplink channel M4/a1 (not explicitly shown) to host base station 2-1. The fast macrodiversity switching between the $_hBTS$ and the $_{a1}BTS$ is under control of the $_hZM$ and the $_{a1}ZM$ in the base stations $_hBS$ and $_{a1}BS$. Similar uplink channels exist for the additional BSs, namely $_{a2}BS, \ldots, _{a(N-1)}BS$ In FIG. 8, a representation of the timing in a GSM system is shown. In the 800–900 MHz wireless spectrum, the GSM frequency channels occur in 25 MHz bands including the channels $CH_0, CH_1, CH_2, \ldots, CH_c, \ldots, CH_C$. Each one of the channels, such as typical channel $CH_c$, includes a 200 KHz band which represents a typical GSM frequency channel with a center frequency $\omega_c$. Each GSM frequency channel is further divided into eight time slots in a GSM TDMA frame including the time slots $TS_0, TS_1, \ldots, TS_7$. The GSM TDMA frame is ($60/13 \times 10^{-3}$ second or approximately $4.615 \times 10^{-3}$ second). Each time slot, such as time slot $TS_1$, is represented by 148 bit periods, including 3 tail bit periods, TB, at the beginning and end and guard bit periods at the beginning and end so that nominally 8.25 guard bit periods are present between bursts.

In FIG. 9, schematic burst uplink sequences are transmitted without timing advance by the transmitters $MS_{TX}$ of the mobile stations $MS_1$, $MS_2$ and $MS_3$, that is, by MS transmitters $TX_1, TX_2$ and $TX_3$, respectively, (not shown) of FIG. 7 to the $_hBTS$ 2-1. The communication M1/h, from $MS_1$ on an uplink channel to host base station $_hBTS$ 2-1, occurs in time slot TS0 with reference to the system timing represented by axis $T_{s@M1}$ at $MS_1$. The communication M2/h, from $MS_2$ on an uplink channel to host base station $_1BTS$ 2-1, occurs in time slot TS1 with reference to the system timing represented by axis $T_{s@M2}$ at $MS_2$. The communication M3/h, from $MS_3$ on an uplink channel to host base station $_hBTS$ 2-1, occurs in time slot TS2 with reference to the system timing represented by axis $T_{s@M3}$ at $MS_3$. The users $MS_1$, $MS_2$ and $MS_3$ of FIG. 7 use time slots TS0, TS1 and TS2, respectively, that are synchronized with time slot boundaries at t=0, t=1, t=2, t=3, t=4 and t=5.

In FIG. 10, schematic burst sequences, transmitted as described in FIG. 9, are received at the receiver $_hBTS_{RX}$ of the $_hBTS$ 2-1 and represent the uplink operation of received signals sent by mobile stations $MS_1$, $MS_2$ and $MS_3$ of FIG. 7 without timing advance. The communication M1/h, from $MS_1$, on an uplink channel to host base station $_hBTS$ 2-1, occurs delayed as received at $_hBTS$ by delay $TD1_h$ relative to the TS0 burst window from t=1 to t=2 as measured with reference to the system timing represented by axis $T_{s@h}$ at base station $_hBTS$ 2-1. The communication M2/h, from $MS_2$ on an uplink channel received at the $_hBTS$ host base station 2-1, arrives delayed by delay $TD2_h$ relative to the TS1 burst window from t=2 to t=3 as measured with reference to the system timing represented by axis $T_{s@h}$ at base station $_hBTS$ 2-1. The communication M3/h, from $MS_3$ to host base station $_hBTS$ 2-1, arrives delayed by delay $TD3_h$ at $_hBTS$ relative to TS2 burst window from t=3 to t=4 as measured with reference to the system timing represented by axis $T_{s@h}$ at base station $_hBTS$ 2-1. In FIG. 10, the bursts M2/h and M3/h overlap in time as received at $_hBTS$. Since no timing advance has been set for $MS_1$, $MS_2$ or $MS_3$ in FIG. 10, the timing advances are $TA_{M1}=0$, $TA_{M2}=0$ and $TA_{M3}=0$, respectively.

In FIG. 11, schematic burst uplink sequences, like those of FIG. 9 but with timing advances, from the transmitters $MS_{TX}$ of the mobile stations $MS_1$, $MS_2$ and $MS_3$ are transmitted to the host base station $_hBTS$ 2-1. The communication M1/h, from $MS_1$, on an uplink channel to host base station $_hBTS$ 2-1, occurs advanced of the time slot TS0 by an advance $TA_{M1}$, equal to the delay $TD1_h$ of FIG. 10 with reference to the system timing represented by axis $T_{S@M1}$ at $MS_1$. The communication M2/h, from $MS_2$ on an uplink channel to host base station $_hBTS$ 2-1, occurs advanced of the time slot TS1 by an advance $TA_{M2}$ equal to the delay $TD2_h$ of FIG. 10 with reference to the system timing represented by axis $T_{S@M2}$ at $MS_2$. The communication M3/h, from $MS_3$ on an uplink channel to host base station $_hBTS$ 2-1, occurs advanced of the time slot TS2 by an advance $TA_{M3}$ equal to the delay $TD3_h$ of FIG. 10 with reference to the system timing represented by axis $T_{S@M3}$ at $MS_3$. In FIG. 11, the timing advances set for $MS_1$, $MS_2$ or $MS_3$ are $TA_{M1}=TD1_h$, $TA_{M2}=TD2_h$ and $TA_{M3}=TD3_h$, respectively.

FIG. 12 depicts schematic burst sequences received at the receiver $_hBTS_{RX}$ of the $_hBTS$ for uplink operation of mobile stations with normal timing advances applied under control of the BSS 16 of FIG. 1 as described in connection with FIG. 11. In FIG. 12, the timing advances, TA, for the bursts M1/h, M2/h and M3/h were selected in FIG. 11 to achieve synchronized reception of the bursts at the $_hBTS$ 2-1. The timing advances set in FIG. 11 for $MS_1$, $MS_2$ or $MS_3$ of $TA_{M1}=TD1_h$, $TA_{M2}=TD2_h$ and $TA_{M3}=TD3_h$, respectively, cause the burst of users $MS_1$, $MS_2$ and $MS_3$ to arrive synchronized with the time slots TS0, TS1 and TS2, respectively, on the time slot boundaries at t=0, t=1, t=2, t=3 and t=4 relative to the timing axis $T_{S@h}$ at the $_hBTS$.

FIG. 13 depicts schematic burst sequences received at the receiver $_{a1}BTS_{RX}$ of the $_{a1}BTS$ for uplink operation of mobile stations after fast macrodiversity switching of dedicated channels without modifying the timing advances previously set as described in connection with FIG. 11. After the dedicated channels for users $MS_1$, $MS_2$ and $MS_3$ of FIG. 7 have been switched from host $_hBTS$ 2-1 to assistant $_{a1}BTS$ 2-2, burst M1/h and burst M3/h based on the system timing $T_{S@a1}$ at assistant $_{a1}BTS$ 2-2 are delayed relative to the burst boundaries at t=1 and t=2 for burst M1/a1 and t=3 and t=4 for burst M3/a1. Burst M2/a1 has burst boundaries t=2- and t=3-. In FIG. 13, the burst M1/a1, M2/a1 and M3/a1 have time delays $TD_{M1}=TD1_{a1}$, $TD_{M2}=TD2_{a1}$ and $TD_{M3}=TD3_{a1}$, respectively. With the fast macrodiversity switching of FIG. 13 from base station $_hBTS$ 2-1 to base station $_{a1}BTS$ 2-2, an uplink burst overlap at the base station $_{a1}BTS$ is present between bursts M1/a1 and M2/a1 that is not compensated by the normal timing advances set for MSs as described in connection with FIG. 11.

The fast macrodiversity switching of FIG. 13 potentially results in a number of uplink problems. Specifically, uplink burst overlaps, for example between bursts M1/a1 and M2/a1, causes interference possibly corrupting the overlapping bursts and rendering them unusable. When the bursts fall outside the nominal time slot boundaries, they cannot be received by the serving BTS, such as assistant base station $_{a1}$BTS, which expects the burst to fall within the time slot boundaries. When the received uplink bursts fall outside the nominal time slot boundaries, they cannot be easily followed with responding downlink bursts transmitted by the serving BTS, such as the $_{a1}$BTS, since typical base station implementations only transmit bursts within the time slot boundaries. The BTS downlink transmit problem also results in an additional receive problem since an MS receiving from the serving BTS expects to receive the transmission within a nominal time slot boundary determined by timing from the host $_h$BTS. Thus if the $_{a1}$BTS as the serving BTS does not transmit at the proper time, the transmitted bursts received at the MSs outside the nominal expected receive boundaries can be lost or corrupted.

The operation of the fast macrodiversity switching of FIG. 13 potentially results in a number of downlink problems. Although there are no downlink communications to a MS from BTSs that are not serving the MS, downlink problems still arise from fast macrodiversity switching when a serving BTS is switched from, for example, the host $_h$BTS to an assistant $_{a1}$BTS or when switching otherwise occurs between BTSs. The downlink problems arise since the transmitter at a BTS in the GSM system sends downlink bursts aligned with the frame timing which is synchronized between BTSs by the host BTS. The first bursts sent from a new serving BTS, newly serving as a result of fast macrodiversity switching or other switching, to the MS arrives at the MS outside the expected receive window for the allocated time slot. Only after some long time, defined in the GSM protocol, the synchronization of the MS with the BTS is adjusted and the problem corrected.

For a number of reasons, the timing delays existing as a result of fast macrodiversity switching, as described in connection with FIG. 9 through FIG. 13, cannot normally be corrected in the same manner that the BSS initiates a timing advance at call setup and at call handover. For example, a BSS normally operates much too slowly to process fast macrodiversity switching. Although dedicated channels are switched with fast macrodiversity switching, the broadcast channels are not. The system timing and the timing reference for switched dedicated channels remains with the host $_h$BTS. Accordingly, the timing available to the BSS using normal timing measurements available to the BSS (used to establish initial timing advances) does not provide the correct timing advances needed by the dedicated channels that are switched among host and assistant BTSs. With the fast macrodiversity switching among BTSs, as described in connection with FIG. 13 and FIG. 16, unwanted burst overlaps result.

In FIG. 9 through FIG. 13, the magnitudes of the delays and shifts have been made large to emphasize the operation and the resulting burst overlap problems. In small cells, however, fast macrodiversity switching may not require additional timing management when it is determined that essentially all MSs use the same timing advance irrespective of the macrodiversity serving site. In larger cells, however, additional timing management is required as a result of uplink and downlink burst overlap. These additional operations apply to all types of TDMA systems (including GSM, GPRS, EDGE and TDMA IS-136) where downlink or uplink macrodiversity is used.

The MSs, such as users $MS_1$, $MS_2$, $MS_3$ and $MS_4$ of FIG. 7, use the guard bands for power ramp-up and ramp-down. In the operations described in connection with fast macrodiversity switching, the guard bands potentially are invaded as a result of burst overlap. When the burst overlap occurs between adjacent bursts of MSs during power-down and power-up sequences, the result can be interference in the bits of both bursts. Such burst overlap can have a severe impact on the ability of a BTS receiver to properly decode/demodulate the received bursts.

Typical TDMA base-stations use narrow band receivers. In addition, each burst may potentially use a different frequency (due to frequency hopping) so that a given receiver resource is typically required to switch to a new frequency for every burst. The burst therefore has a clear time demarcation. A typical receiver is incapable of receiving both bursts if they overlap in time potentially resulting in loss of tail bits (TB). The loss of tail bits is especially detrimental if the tail bits (TB) are being used for channel estimation. Tail bits are often used by receivers for channel estimation in addition to any training sequences that may be embedded within a burst.

A number of embodiments of zone managers with fast macrodiversity timing management are employed to avoid or reduce burst overlap and other timing problems created in an environment employing fast macrodiversity switching of dedicated channels. The choices as to which ones of the embodiments to activate depend upon the particular details of the cellular configuration and the availability of transmitters and receivers and other components that are capable of timely performing the necessary operations for a particular embodiment. Also, the choices are a function of the ability to measure the time delays and responsively apply the timing adjustments to the MSs and the transceiver stations. The ability to measure the time delays and responsively apply the timing adjustments for fast macrodiversity switching is a function of the measurement speed of the measurement means 136 and the bandwidth of the communications among zone managers, transceiver stations and mobile stations.

In the fast macrodiversity timing management embodiment of FIG. 14, optimum uplink fast timing adjustments are applied at the transmitters $MS_{TX}$ of the mobile stations MSs so as to obtain synchronization of the uplink bursts at the receiving base stations. In FIG. 13, the bursts M1/a1, M2/a1 and M3/a1 have time delays $TD_{M1}=TD1_{a1}$, $TD_{M2}=TD2_{a1}$ and $TD_{M3}=TD3_{a1}$, respectively, at the base station $_{a1}$BTS after the fast macrodiversity switching from the base station $_h$BTS. In FIG. 14, the fast uplink timing advances for $MS_1$, $MS_2$ and $MS_3$ are $UTA_{M1}=TD1_h+TD1_{a1}$, $UTA_{M2}=TD2_h+TD2_{a1}$ and $UTA_{M3}=TD3_h+TD3_{a1}$, respectively. The fast macrodiversity timing advances are determined as the sum of the original (slow) timing advances set for $MS_1$, $MS_2$ or $MS_3$ of $TA_{M1}=TD1_h$, $TA_{M2}=TD2_h$ and $TA_{M3}=TD3_h$ as described in connection with FIG. 11 and FIG. 12 and the time delays $TD_{M1}=TD1_{a1}$, $TD_{M2}=TD2_{a1}$ and $TD_{M3}=TD3_{a1}$ described in connection with FIG. 13.

FIG. 15 depicts schematic uplink burst sequences received at the receiver $_{a1}BTS_{RX}$ of the $_{a1}$BTS as a result of transmissions from mobile stations after fast macrodiversity switching of dedicated channels with macrodiversity uplink fast timing adjustments of $UFTA_{M1}=TD1_h+TD1_{a1}$, $UFTA_{M2}=TD2_h+TD2_{a1}$ and $UFTA_{M3}=TD3_h+TD3_{a1}$. The uplink fast timing adjustments are measured, calculated and applied by operation of the zone manager means, for example, the assisting zone manager $_{a1}$ZM 13-2 in cooperation with the host zone manager $_h$ZM 13-1 of FIG. 7. The MD timing control means 133 in FIG. 6 is the means used to determine the uplink fast timing advances, UFTA, based upon the time delays measured by the measurement means 136 of FIG. 6. The uplink fast timing advances, UFTA, of FIG. 14 cause the uplink burst sequences of FIG. 14 to be received at the $_{a1}$BTS optimally aligned in the expected time slots TS0, TS1 and TS2 relative to the system timing axis $T_{s@a1}$ at the $_{a1}$BTS. None of the bursts received at the $_{a1}$BTS invades the guard period, GP, of adjacent bursts. The guard periods between bursts is maintained at 8.25 bit periods and the timing management adjustments are optimal in that bursts received and expected time slots are aligned.

In the fast macrodiversity timing management embodiment of FIG. 16, optimum uplink fast timing adjustments are made to the relative time placement of the receiving windows at the receiver $_{a1}$BTS$_{RX}$ of the serving base station $_{a1}$BTS. The receiving windows $_{a1}$TS0$_O$, $_{a1}$TS1$_o$ and $_{a1}$TS2$_O$ are adjusted with uplink fast time offsets $_{a1}$UFTO$_0$, $_{a1}$UFTO$_1$ and $_{a1}$UFTO$_2$ so that those windows are synchronized with the times that the uplink bursts M1/a1, M2/a1 and M3/a1 are actually received at the receiving base station $_{a1}$BTS. In FIG. 16, like in FIG. 13, the received bursts M1/a1, M2/a1 and M3/a1 have time delays $TD_{M1}=TD1_{a1}$, $TD_{M2}=TD2_{a1}$ and $TD_{M3}=TD3_{a1}$, respectively, at the receiver of base station $_{a1}$BTS after the fast macrodiversity switching from the base station $_h$BTS. In FIG. 16, the uplink (slow) timing advances for MS$_1$, MS$_2$ and MS$_3$ remain as in FIG. 11 with $TA_{M1}=TD1_h$, $TA_{M2}=TD2_h$ and $TA_{M3}=TD3_h$, respectively. The uplink fast timing advances are uplink fast time offsets $_{a1}$UFTO$_0$, $_{a1}$UFTO$_1$ and $_{a1}$UFTO$_2$ for the receiving windows $_{a1}$TS0$_O$, $_{a1}$TS1$_O$ and $_{a1}$TS2$_O$, respectively, that are determined as equal to the time delays $TD_{M1}+TD1_{a1}$, $TD_{M2}=TD2_{a1}$ and $TD_{M3}=TD3_{a1}$ described in connection with FIG. 13. The MD timing control means 133 in FIG. 6 is the means used to determine the uplink fast time offsets $_{a1}$UFTO$_0$, $_{a1}$UFTO$_1$ and $_{a1}$UFTO$_2$ for the receiving windows $_{a1}$TS0$_O$, $_{a1}$TS1$_O$ and $_{a1}$TS2$_O$. With the shift in receiving windows, the received bursts are synchronously aligned with the time slots.

In FIG. 17, the burst overlap problem is manifested at downlink transmitters $_h$BTS$_{TX}$ in the $_h$BTS and $_{a1}$BTS$_{TX}$ in the $_{a1}$BTS. Since an MS such as MS1 expects to receive bursts from BTSs within certain receive windows determined based on timing from the host base station $_h$BTS beacon (BCCH), the non-host assisting macrodiversity transmitter, such as $_{a1}$BTS$_{TX}$, must suitably advance or retard its transmission so that the burst arrives at exactly the time expected by the MS. The MS is unaware of the source of the transmission and therefore has no capacity to make adjustments after a switch from the host BTS to the assistant BTS. To compensate, the assisting BTS, such as $_{a1}$BTS, adjusts its transmitter $_{a1}$BTS$_{TX}$ burst timing by applying a downlink fast time offset (DFTO) to all of its transmissions to MSs. In addition, since an assisting BTS serves more than one MS, the assisting BTS applies different DFTOs to different MS transmissions, for example, transmissions to MS$_1$, MS$_2$ and MS$_3$ using DFTO$_1$, DFTO$_2$ and DFTO$_3$, respectively. The requirement for different DFTOs, however, may cause problems.

One problem is that the BTS may be required to begin transmission of two bursts simultaneously or advance the transmission for a second MS so far ahead that the transmission for a first MS has not ended resulting in an overlap of transmit bursts for the first and second MSs. In some embodiments, such operation is not tolerable and must be avoided. The steps required for avoiding burst overlap may place a limitation on the size of the cells that can be served by BTSs.

Another problem is that different DFTOs can cause overlap between busts so that they invade and thereby shorten the guard band used to separate bursts. Since the guard band is used by a BTS to ramp-up and ramp-down its own transmitter, shortening the guard band period results in shorter times for power ramps and hence burst overlap should be avoided for this reason.

In the fast macrodiversity timing management embodiment of FIG. 17, a downlink burst overlap problem is avoided. Initially, a downlink transmission h/M1$_h$ from the host transmitter $_h$BTS$_{TX}$ of host $_h$BTS is transmitted aligned with time slot TS0 measured by the system timing axis $T_{s@h}$ at host $_h$BTS. The downlink transmission h/M1$_h$ arrives at the receiver M1$_{RX}$ of mobile station M1 as the burst h/M1$_{M1}$ with a time delay of TDh$_{M1}$ measured with reference to the system timing axis $T_{S@M1}$ at MS1. The time delay TDh$_{M1}$ misaligns the burst h/M1$_{M1}$ with the nominal time slot TS0 measured by the system timing axis $T_{s@M1}$ at MS1. In order to compensate for the time delay TDh$_{M1}$, the transmission burst h/M1$_{O:h}$ from the host transmitter $_h$BTS$_{TX}$ of host $_h$BTS is given a downlink fast time offset DFTO$_h$ that is equal in magnitude to the time delay TDh$_{M1}$. When the transmission burst h/M1$_{O:h}$ from host $_h$BTS arrives as burst h/M1$_{O:M1}$ at the receiver M1$_{RX}$ of mobile station M1, burst h/M1$_{O:M1}$ is aligned with the nominal time slot TS0 measured with reference to the system timing axis $T_{S@M1}$, at MS1.

After a fast macrodiversity switching, the downlink h/M1$_h$ burst or h/M1$_{O:h}$ from the host transmitter $_h$BTS$_{TX}$ of host $_h$BTS is switched to assistant transmitter $_{a1}$BTS$_{TX}$ of assistant $_{a1}$BTS. When the transmission burst a1/M1$_{a1}$ from assistant transmitter $_{a1}$BTS$_{TX}$ is transmitted aligned with time slot TS0 measured by the system timing axis $T_{s@a1}$ at assistant $_{a1}$BTS, the downlink transmission $_{a1/M1a1}$, arrives at the receiver M1$_{RX}$ of mobile station M1 as the burst a1/M1$_{M1}$ with a time delay of TDa1$_{M1}$, measured with reference to the system timing axis $T_{S@M1}$ at MS1. The time delay TDa1$_{M1}$ misaligns the burst a1/M1$_{M1}$ relative to the nominal time slot TS0 measured by the system timing axis $T_{S@M1}$, at MS1. In order to compensate for the time delay TDa1$_{M1}$, the transmission burst a1/M1$_{O:a1}$ from the assistant transmitter $_{a1}$BTS$_{TX}$ of assistant $_{a1}$BTS is given a downlink fast time offset DFTO$_{a1}$ that is equal in magnitude to the time delay TDa1$_{M1}$. When the transmission burst a1/M1$_{O:a1}$ from assistant $_{a1}$BTS arrives as burst a1/M1$_{O:M1}$ at the receiver M1$_{RX}$ of mobile station M1, burst h/M1$_{O:M1}$ is aligned with the nominal time slot TS0 measured by the system timing axis $T_{S@M1}$ at MS1.

Sub-optimal Fast Timing Advance (FTA) Embodiments. In a sub-optimal fast macrodiversity timing management embodiment, the timing advance is chosen to be sub-optimal for some host base stations so as to mitigate burst overlap problems caused by switching to other base stations. The host ZM selects a sub-optimal fast timing advance based upon calculations using timing records stored in database 25 of FIG. 6. Embodiments selecting a sub-optimal timing advance operate, for example, by calculating a simple average timing advance or by calculating a weighted average of the timing advances calculated for N candidate macrodiversity base stations. For the weighted average, the weighting factors are chosen, for example, based on the probability of each base station being chosen as the serving macrodiversity base station to transmit/receive dedicated channels for a particular MS.

Referring to FIG. 7, the N candidate macrodiversity base stations include, for example, base stations $_h$BS, $_{a1}$BS, $_{a2}$BS, . . ., $_{a(N-1)}$BS, where N can be any integer. In operation, the zone manager of FIG. 6 calculates or receives, for storage in timing records in database 25 of FIG. 6, candidate timing advances for each particular MS in FIG. 7 relative to the N base stations $_h$BS, $_{a1}$BS, $_{a2}$BS, . . ., $_{a(N-1)}$BS. The macrodiversity processor 20 operates to retrieve and process the candidate timing advances for the candidate base stations from the timing records in database 25. If, for example, N=4 and the candidate timing advances for base stations $_h$BS, $_{a1}$BS, $_{a2}$BS, and $_{a3}$BS are 4, 3, 6 and 7 bit periods, respectively, then an average timing advance, FTA$_A$, calculated by macrodiversity processor 20 is (4+3+6+7)/4 so that FTA$_A$=5. In this example, the zone manager sets the timing advance to 5. Although a timing advance of 5 is sub-optimal for some or all of the base stations, the value may provide acceptable operation for each of the base stations $_h$BS, $_{a1}$BS, $_{a2}$BS, and $_{a3}$BS.

In another fast macrodiversity timing management embodiment, the zone manager 13 of FIG. 6 stores records, in the timing record fields of database 25, of the historical use of particular MSs of particular base stations. These historical records of use are interpreted to predict the probability of future use and are used by the macrodiversity processor 20 to determine the timing advance to be used using a weighted average. For example, if base stations $_h$BS, $_{a1}$BS, $_{a2}$BS, and $_{a3}$BS have been historically used in units proportional to 1, 7, 1 and 1 times of use, respectively, the weighted average for the time advance bit periods of 4, 3, 6, and 7, respectively, is [(1)(4)+(7)(3)+1(6)+1(7)]/10 which equals 38/10 for a weighted average timing advance, FTA$_{WA}$, of FTA$_{WA}$=3.8 bit periods. Using a timing advance of 3.8 bit periods rather than 5 bit periods is based on the probability that, as a result of a fast macrodiversity switch, the assistant $_{a1}$BTS is seven times more likely to be selected as the serving BTS than any of the other BTSs. Such history may be maintained over a recent period of activity by the MS (some form of a sliding window) which may extend from a few seconds to several minutes or even larger periods which may include periods of inactivity.

Packet Scheduling and Resource Allocation Embodiments. In these fast macrodiversity timing management embodiments, scheduling and resource allocation are used to mitigate problems of burst overlap in environments where fast macrodiversity switching is occurring. These embodiments are explained based upon the initial resource assignment shown in TABLE 1. TABLE 1 represents the FIG. 7 system using four mobiles stations (MS$_1$, MS$_2$, MS$_3$, MS$_4$) and two base stations ($_h$BTS, $_{a1}$BTS). All mobile stations use $_h$BTS as their host site. Mobiles MS$_1$, and MS$_4$ are assigned time slot TS1 (for example, initially by the BSS 16 of FIG. 1). Mobiles MS$_2$ and MS$_3$ are assigned TS2 (for example, initially by the BSS 16 of FIG. 1).

TABLE 1

Resource Assignment

| Mobile Station | FTA $_h$BTS | FTA $_{a1}$BTS | Time Slot Assigned |
|---|---|---|---|
| MS$_1$ | 5 | 10 | TS1 |
| MS$_2$ | 10 | 5 | TS2 |
| MS$_3$ | 5 | 10 | TS2 |
| MS$_4$ | 10 | 5 | TS1 |

Packet Scheduling Embodiments. In a packet scheduling fast macrodiversity timing management embodiment that avoids burst overlap problems, packets are scheduled so that successive time slots are not scheduled for MSs that will result in a burst overlap problem. As an example, packets in adjacent time slots are scheduled using non-conflicting groups. A non-conflicting group has packets in adjacent time slots that can be transmitted without causing timing advance problems. The groups are updated periodically (for instance, after each radio block) based on new information concerning the timing advance and the availability of packets to be transmitted. In operation, when packets are transmitted, a non-conflicting group is chosen for transmission instead of choosing a single packet. This embodiment is also extended in some embodiments to include deadlines and other considerations.

In FIG. 18, the burst sequences are examples of packets that are rescheduled to avoid burst overlap problems. In FIG. 18, the four mobiles stations (MS$_1$, MS$_2$, MS$_3$, MS$_4$) have been initially scheduled with a sequence of bursts having an initial sequence order MS$_1$(TS1), MS$_2$(TS2), MS$_4$(TS1), MS$_3$(TS2), MS$_1$(TS1), MS$_3$(TS2), MS$_4$(TS1), MS$_2$(TS2). In the (a) row of FIG. 18, the reception at the host $_h$BTS includes a guard band appropriately between each burst. In FIG. 18, for purposes of explanation, it is assumed that MS$_1$(TS1), MS$_2$(TS2), MS$_4$(TS1) are switched by macrodiversity switching for serving by the assistant $_{a1}$BTS while MS$_3$ remains served by the host $_h$BTS. Accordingly, as shown in the (b) row of FIG. 18, the sequence of bursts retains the initial sequence order and a burst overlap problem results between the MS$_1$(TS1) and MS$_2$(TS2) bursts received at the assistant $_{a1}$BTS. This burst overlap problem can be avoided however, if the MS$_1$(TS1) and MS$_3$(TS2) bursts and the MS$_4$(TS1) and MS$_2$(TS2) bursts are rescheduled and grouped as shown in the (c) row of FIG. 15 according to a rescheduled sequence order MS$_1$(TS1), MS$_3$(TS2), MS$_4$(TS1), MS$_2$(TS2), MS$_1$(TS1), MS$_2$(TS2), MS$_4$(TS1), MS$_3$(TS2)

In FIG. 19, the burst sequences are examples of packets that cannot be rescheduled to avoid burst overlap problems. In FIG. 19, the four mobiles stations (MS$_1$, MS$_2$, MS$_3$, MS$_4$) have been assigned and scheduled in the order MS$_1$(TS1), MS$_2$(TS2), MS$_3$(TS1), MS$_4$(TS2), MS$_1$(TS1), MS$_4$(TS2), MS$_3$(TS1), MS$_2$(TS2) and the reception at the host $_h$BTS guard band between each burst as shown in the (a) row of FIG. 19. In FIG. 19, it is assumed that MS$_1$(TS1), MS$_2$(TS2), MS$_3$(TS1) are switched by fast macrodiversity switching for serving by the assistant $_{a1}$BTS while MS$_4$ remains served by the host $_h$BTS. Accordingly, as shown in the (b) row of FIG. 19, a burst overlap problem results between the MS$_1$(TS1) and MS$_2$(TS2) bursts and between the MS$_3$(TS1) and MS$_2$(TS2) bursts received at the assistant $_{a1}$BTS. This burst overlap problem can not be avoided by scheduling as done in FIG. 18. If the MS$_1$(TS1) and MS$_2$(TS2) bursts and the MS$_3$(TS1) and MS$_4$(TS2) bursts are grouped as shown in the (b) row of FIG. 19 a burst overlap problem exists. If the MS$_1$(TS1) and MS$_4$(TS2) bursts and the MS$_3$(TS1) and MS$_2$(TS2) bursts are grouped as shown in the (c) row of FIG. 19 a burst overlap problem exists. No grouping for scheduling works in the example of FIG. 19.

Packet Resource Allocation Embodiments. In packet resource allocation fast macrodiversity timing management embodiments, MSs are assigned to time slots such that MSs in adjacent time-slots do not fall in the extreme ends of the macrodiversity zone or do not otherwise have properties that give rise to burst overlap. As MSs move through the cells and the macrodiversity zone, they are reassigned to resources depending on the timing advances set as a function of the location of the mobiles. As an example, packets in adjacent time slots are assigned to non-conflicting resource groups. A non-conflicting resource group consists of packets in adjacent time-slots that can be transmitted without causing timing advance problems. The groups are updated periodically (for instance, after each radio block) based on new information concerning the timing advance and the availability of packets to be transmitted. Thus when packets are assigned resources, a non-conflicting resource group is chosen for assignment. Due to varying conditions during progress of a call, the mobiles may be re-assigned to different non-conflicting resource groups during the call.

FIG. 20 is an example of packet resource allocation which has re-assignment of MSs to different non-conflicting resource groups. In FIG. 20, the four mobiles stations ($MS_1$, $MS_2$, $MS_3$, $MS_4$) where the initial time slot sequence order of $MS_1(TS1)$, $MS_2(TS2)$, $MS_3(TS1)$, $MS_4(TS2)$, $MS_1(TS1)$, $MS_4(TS2)$, $MS_3(TS1)$, $MS_2(TS2)$ in FIG. 19 has been altered by interchanging the times slots of $MS_2$ and $MS_3$ so that the reassigned time slot sequence order is $MS_1(TS1)$, $MS_3(TS2)$, $MS_2(TS1)$, $MS_4(TS2)$, $MS_1(TS1)$, $MS_4(TS2)$, $MS_2(TS1)$, $MS_3(TS2)$. The reception at the host $_hBTS$ with the reassigned time slot sequence order has the guard bands appropriately between each burst as shown in the (a) row of FIG. 20. In FIG. 20, it is assumed that the dedicated channels of $MS_1(TS1)$, $MS_2(TS2)$, $MS_3(TS1)$ are switched by fast macrodiversity switching for serving by the assistant $_{a1}BTS$ while $MS_4$ remains served by the host $_hBTS$. As shown in the (b) row of FIG. 20, where the reassigned time slot sequence order is unchanged over the (a) row of FIG. 20, a burst overlap problem results between the $MS_3(TS2)$ and $MS_2(TS1)$ bursts received at the assistant $_{a1}BTS$. Unlike FIG. 19, however, this burst overlap problem can now be avoided by rescheduling so that the reassignment facilitates avoiding the burst overlap problem. When the $MS_1(TS1)$ and $MS_4(TS2)$ bursts and the $MS_2(TS1)$ and $MS_3(TS2)$ bursts are grouped as shown in the (c) row of FIG. 20, the rescheduling eliminates the burst overlap problem. Depending on the initial scheduling and the initial assignment and the switching selected, reassignment can be effective to avoid the burst overlap problem without also requiring rescheduling.

Timing Advance Update Procedures. In order to prevent macrodiversity switching from causing burst overlaps, frequent updating of the timing advance is beneficial. Low speed and high-speed update procedures are employed alone or in combination. Ordinarily, once a base station has been determined by the switching processing means 131 and the MD timing control means 133 of FIG. 6 to be the best receive site for an MS, that base station statistically continues to remain the best site for a period of time ($T_B$). If $T_B$ is large compared with the high-speed timing advance update procedure execution time, $T_E$, the high-speed timing advance update procedure of the MD timing control means 133 of FIG. 6 is executed by the zone manager and assigns a suitable new timing advance to the MS. In one embodiment, the high-speed timing advance update procedure operates to assign a new timing advance value to the MS whenever a base station fast macrodiversity switch occurs. If $T_B$ is determined to be small compared with $T_E$, the high-speed update procedure is aborted in favor of alternate procedures for setting the timing advance, for example, using GPRS.

Figure 21:
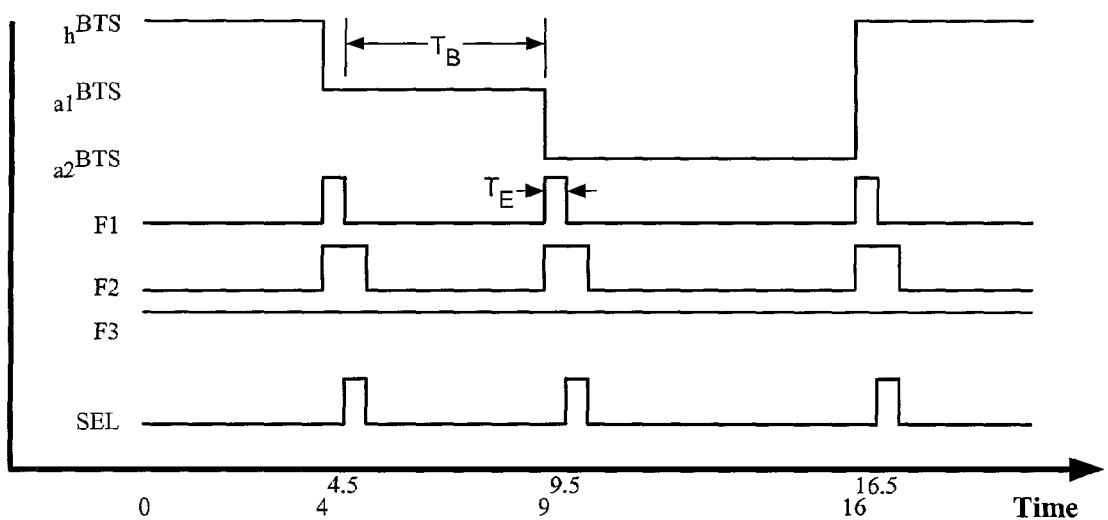
FIG. 21 depicts an example of timing advance update procedures.
Figure 22:
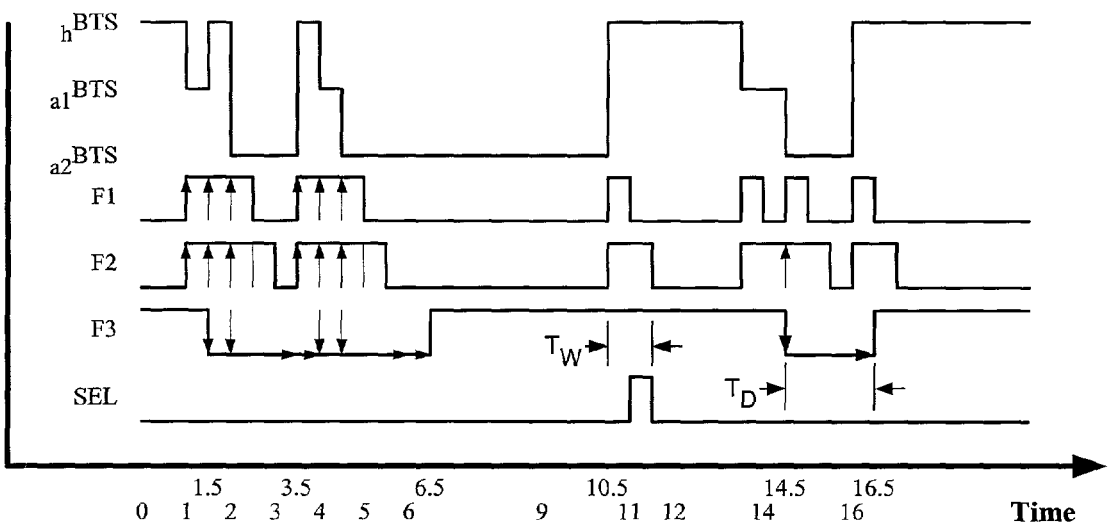
FIG. 22 depicts another example of timing advance update procedures.

Examples of the timing advance update procedures executed by the MD timing control means 133 of FIG. 6 are schematically depicted in FIG. 21 and FIG. 22. In FIG. 21, the serving BTS is switched among the $_hBTS$, $_{a1}BTS$ and $_{a2}BTS$ with switch times at t=4, t=9 and t=16. The function F1, processed by the macrodiversity processor 20 in FIG. 6, initiates a timing advance update calculation at each of the switch times at t=4, t=9 and t=16. The function F2, processed by the macrodiversity processor 20, sets a window, $T_w$, each time a timing advance update calculation is initiated at t=4, t=9 and t=16. The function F3, processed by the macro-diversity processor 20, enables the selected calculated timing advance to be applied to the MS unless a subsequent timing advance update calculation is initiated while the window, $T_w$, is active for the first initiated update calculation. In FIG. 21, the period of time $T_B$ is long compared with $T_E$ so the function F3 remains enabled. The recalculated timing advances recalculated in FIG. 21 are selected to be applied to the MS at t=4.5, t=9.5 and t=16.5.

In FIG. 22, the serving BTS is switched among the $_hBTS$, $_{a1}BTS$ and $_{a2}BTS$ with six switch times between t=0 and t=4. During that period, the function F1, processed by the macrodiversity processor 20 in FIG. 6, initiates a timing advance update calculation at each of the six switch times. The function F2, processed by the macrodiversity processor 20, sets a window, $T_w$, each time a timing advance update calculation is initiated. The window period, $T_w$, for function F2 is, in the embodiment described, two times the calculation period, $T_E$. However, $T_w$ is a tunable parameter of the timing management system. The window $T_w$ is set from t=1 to t=3 and from t=3.5 to t=6. With the F2 window set, F3 disables any timing advance update from t=1.5 to t=6.5 and from t=14.5 to t=16.5. The disable period, TD, for function F3 is, in the embodiment described, four times the calculation period, $T_E$. However, $T_D$ is a tunable parameter of the timing management system. The switch at t=10.5 is not disabled and results in selection of the timing advance update at t=11 for updating the MS.

The FIG. 21 and FIG. 22 timing advance processing is one of many embodiments for implementing the F1, F2 and F3 functions of the MD timing control means 133 that is typically implemented as control code in the zone manager 13 of FIG. 6. The timing records in data base 25 store the information required for the algorithms including the values for F1, F2 and F3, including each macrodiversity switch time and including the timing advance calculations based upon measurements by the measurement means 136 of FIG. 6.

Macrodiversity Base Station Selection. When fast macrodiversity switching is enabled, a base station selection algorithm as part of the switching processing means 131 of FIG. 6 is executed by the zone manager to determine when and to which one of the candidate base stations to switch. The selected base station is determined considering delay time, timing advance and burst overlap information stored in database 25. The degree of burst overlap is used as a factor influencing the choice of the macrodiversity base station to which a switch will be made.

The zone managers including the switching control means 132 of FIG. 6 control the dynamic switching among preferred ones of the transceiver stations to provide dedicated channels for the mobile stations. Such dynamic switching has the potential for causing certain ones of the bursts to have timing shifts that result in certain misalignments of the bursts. In general, the operation of the macrodiversity timing control means 133 of FIG. 6 controls the timing of the bursts in response to the dynamic switching to reduce those certain misalignments of the bursts. However, at times, a postulated dynamic switching has the potential for causing those certain ones of the bursts to have timing shifts that will not only result in those certain misalignments of the bursts but also will result in other misalignments with other ones of the bursts where those other misalignments will not be adequately reduced by the macrodiversity timing control means. In such circumstances, the zone managers including the switching control means 132 and the macrodiversity timing control means 133 inhibit the postulated dynamic switching.

Use of Software Defined Radios (SDR). Typical TDMA base-stations use narrow band transceivers which are incapable of supporting some fast macrodiversity timing management embodiments. However, since each burst may potentially use a different frequency (due to frequency hopping), a given transceiver resource is required to switch to a new frequency every burst. The burst therefore has a clear frequency demarcation. Conventional narrow-band receivers are incapable of receiving both bursts if they overlap in time resulting in loss of bits. A wideband SDR receiver, however, is used in some embodiments of fast macrodiversity switching to avoid loss of bits. Similarly, a wideband transmitter can be used to avoid problems at fast macrodiversity transmitters. Referring to FIG. 13, by way of example, assume burst M1/a1 is at one frequency and burst M2/a1 is at another frequency due to frequency hopping. With this example, a wideband SDR receiver retrieves the burst overlap region between t=2− and t=2+ at two different frequencies without loss of the bits in either burst M1/a1 or burst M2/a1. To utilize different frequencies in this manner, some or all of the transceivers of FIG. 5 are wideband SDR receivers under control of the zone manager for reassembly of burst from bits obtained from different frequencies. Referring to FIG. 13, for example, the bits of burst M1/a1 between t=1+ and t=2− are retrieved at one frequency and the bits of burst M1/a1 between t=2− and t=2+are retrieved at a different frequency.

The problems described above apply specifically to macrodiversity. While the use of wideband receivers and transmitters has been considered for other applications and reasons, their application to the unique problems related to macrodiversity in TDMA systems has not been considered. Packet scheduling, resource allocation and optimal timing advance and site selection algorithms also form a unique and novel approach to solving the problems associated with larger cells.

While the invention has been particularly shown and described with reference to preferred embodiments thereof it will be understood by those skilled in the art that various changes in form and details may be made therein without departing from the scope of the invention.

The invention claimed is:

1. A communication system for communication using wireless signals, said wireless signals including downlink signals to and uplink signals from mobile stations, said wireless signals having bursts in time slots comprising,
   a plurality of transceiver stations having broadcast channels and dedicated channels for said wireless signals where the dedicated channels are switchable among transceiver stations independently of said broadcast channels,
   system timing control means for controlling the initial timing of said bursts with initial timing advances that provide for initial guard bands between bursts,
   zone manager means including,
      switching processing means providing switching information for identifying candidate ones of said transceiver stations available to be used to service dedicated channels for said mobile stations,
      switching control means for dynamic switching among said preferred ones of said transceiver stations to provide said dedicated channels for said mobile stations, said dynamic switching having the potential for causing ones of said bursts to have timing shifts that result in misalignment of said bursts,
      macrodiversity timing control means for controlling the timing of said bursts in response to said dynamic switching to reduce said misalignment of said bursts.

2. The communication system of claim 1 wherein said macrodiversity timing control means provides time offsets that compensate for said time shifts to thereby reduce said misalignment of said bursts.

3. The communication system of claim 1 wherein said dynamic switching causes a first burst for one mobile station in one time slot to have a particular time shift that overlaps a second burst for another mobile station in an adjacent time slot and where said macrodiversity timing control means provides a particular time offset that compensates said particular time shift to reduce overlap of said first burst and said second burst.

4. The communication system of claim 1 wherein said communication system is a GSM system.

5. The communication system of claim 1 wherein said system includes one or more particular mobile stations and said zone manager means, for said particular mobile stations, includes a particular zone manager that functions as a host zone manager for said particular mobile stations and functions as an assistant zone manager for other mobile stations.

6. The communication system of claim 1 wherein said switching control means is responsive to said switching information for dynamic switching said dedicated channels as frequently as a signal switch time determined as a function of a frame rate of said wireless signals.

7. The communication system of claim 6 wherein said switch time is approximately determined by said signal frame rate.

8. The communication system of claim 6 wherein said switch time is determined as a function of a multiple of said signal frame rate.

9. The communication system of claim 6 wherein said switch time is less than one second.

10. The communication system of claim 1 wherein said zone manager means is formed of a plurality of distributed zone managers, one for each of said transceiver stations.

11. The communication system of claim 10 wherein said zone managers are co-located with said transceiver stations at macrodiverse locations.

12. The communication system of claim 11 wherein said zone managers are interconnected with each other forming a network.

13. The communication system of claim 10 wherein two or more of said zone managers are co-located at a common location.

14. The communication system of claim 13 wherein said common location is a base station controller in a cellular system.

15. The communication system of claim 10 wherein said plurality of zone managers includes, for each of said particular mobile stations, a host zone manager and one or more assistant zone managers.

16. The communication system of claim 1 wherein,
   said zone manager means is formed of a plurality of discreet macrodiverse zone managers, one for each of said transceiver stations,
   said transceiver stations include a plurality of macrodiverse broadcasters distributed at macro-diverse broadcaster locations for broadcasting said downlink signals and include a plurality of macro-diverse collector means distributed at macro-diverse collector locations for receiving said uplink signals and providing received signals for said particular mobile station, said switching processing means for a host zone manager provides host switching information for determining candidate ones of said broadcasters and candidate ones of said collector means for said dedicated channels for said mobile stations, said switching control means dynamically selects said dedicated channels for said mobile stations by selecting said candidate ones of said broadcasters to provide particular downlink signals and dynamically selects said candidate ones of said collector means to receive particular uplink signals for said particular mobile stations.

17. The communication system of claim 16 wherein, said switching control means for said host zone manager is responsive to said host switching information for switching said dedicated channels.

18. The communication system of claim 16 wherein, said switching control means for said host zone manager is responsive to said host switching information for switching said dedicated channels as frequently as a signal switch time determined as a function of a signal frame rate of said wireless signals.

19. The communication system of claim 18 wherein said switch time is determined as a function of a multiple of said signal frame rate.

20. The communication system of claim 16 wherein each one of said zone managers has,
a resource manager for managing available resources in said communication system,
an airlink controller for controlling the radio channels in said communication system,
interface means for providing interfaces for said one of said zone managers.

21. The communication system of claim 20 wherein said interface means includes a zone_manager-to-zone_manager interface manager for controlling zone manager links among said zone managers.

22. The communication system of claim 20 wherein said interface means includes a transceiver interface for controlling a transceiver link from said particular one of said zone managers to a corresponding transceiver station.

23. The communication system of claim 20 wherein said interface means includes a controller link to said base station controller for communication between said zone manager and the base station controller.

24. The communication system of claim 23 wherein said controller link is an Abis link.

25. The communication system of claim 16 wherein one or more of said zone managers is integrated into one or more of said transceiver stations.

26. The communication system of claim 16 wherein said switching control means includes broadcaster commands for controlling downlink signals to each of selected ones of said mobile stations and collector commands for controlling the plurality of macro-diverse collector means for switching the uplink signals for each of said selected ones of said mobile stations.

27. The communication system of claim 1 wherein a postulated dynamic switching has the potential for causing said ones of said bursts to have timing shifts that result in other misalignments with other ones of said burst where said other misalignments will not be adequately reduced by said macrodiversity timing control means whereby said postulated dynamic switching is inhibited.

28. The communication system of claim 1 wherein said wireless signals employ multiple access protocols.

29. The communication system of claim 28 wherein said wireless signals employ TDMA protocols.

30. The communication system of claim 1 wherein said transceiver stations communicate over a region containing one or more zones.

31. The communication system of claim 2 wherein said time offsets for said mobile stations are selected to be sub-optimal for some of the transceiver stations so as to mitigate burst misalignment problems caused by switching to other of the transceiver stations.

32. The communication system of claim 2 wherein said time offsets for said mobile stations for uplink communications are different from said time offsets for downlink communications.

33. The communication system of claim 32 wherein, for each of said mobile stations, a plurality of candidate transceiver stations are present for serving dedicated channels, said candidate transceiver stations having candidate timing advances for use in serving each of said mobile stations, said timing advances determined for each of said mobile stations using an average of said candidate timing advances.

34. The communication system of claim 33 wherein said average is a weighted average based upon probabilities of selecting each of said candidate transceiver stations.

35. The communication system of claim 1 wherein bursts from said mobile stations have an initial burst sequence order that when received at ones of said transceiver stations causes a timing misalignment and wherein said macrodiversity timing control means reschedules said initial burst sequence order to a rescheduled sequence order that when received at ones of said transceiver stations reduces said burst misalignment.

36. The communication system of claim 35 wherein said rescheduled sequence order is based upon grouping bursts in groups to form said rescheduled sequence order.

37. The communication system of claim 36 wherein said groups are periodically reformed.

38. The communication system of claim 36 wherein said groups are reformed in response to each instance of said dynamic switching.

39. The communication system of claim 1 wherein bursts from said mobile stations are assigned in time slots with an initial time slot sequence order that when received at ones of said transceiver stations causes an initial burst sequence timing misalignment and wherein said macrodiversity timing control means reassigns said time slots to have a reassigned time slot sequence order that reduces said misalignment.

40. The communication system of claim 39 wherein said reassigned time slot sequence order is based upon grouping bursts in groups.

41. The communication system of claim 40 wherein said groups are periodically reformed.

42. The communication system of claim 40 wherein said groups are reformed in response to each instance of said dynamic switching.

43. The communication system of claim 1 wherein said macrodiversity timing control means operates with an update procedure having an execution time, $T_E$, and wherein said update procedure is initiated by said zone manager means whenever a dynamic switching occurs.

44. The communication system of claim 43 wherein said macrodiversity timing control means inhibits updates whenever said execution time, $T_E$, is small compared with a time duration, $T_B$, since the last update procedure was initiated.

45. The communication system of claim 44 wherein if $T_B$ is determined to be small compared with $T_E$, the high-speed update procedure is aborted.

46. The communication system of claim 1 wherein said macrodiversity timing control means operates with an update procedure having an execution time, $T_E$, and wherein a function F1 initiates said update procedure whenever a dynamic switch occurs, wherein a function F2 sets a window, $T_w$, each time a timing advance update procedure is initiated and wherein a function F3 enables a calculated timing advance to be applied to a mobile station unless a subsequent timing advance update procedure is initiated while the window, $T_w$, is active.

47. The communication system of claim 1 wherein said transceiver stations include software defined radios.

48. In a communication system for communication using wireless signals, said wireless signals including downlink signals to and uplink signals from mobile stations, the method comprising, transmitting, from a plurality of transceiver stations, broadcast channels and dedicated channels for said wireless signals, were the dedicated channels are switchable independently of said broadcast channels, controlling the timing of said bursts with initial timing advances that provide for initial guard bands between bursts, providing switching information for identifying candidate ones of said transceiver stations to service dedicated channels for said mobile stations, dynamically switching among said candidate ones of said transceiver stations to provide said dedicated channels for said mobile stations, said switching causing ones of said bursts to have time shifts, controlling the timing of said bursts in response to said dynamic switching to reduce misalignment of said bursts.

49. In the method of claim 48 wherein said controlling of the timing of said bursts provides offsets that compensate for said time shifts to thereby reduce said misalignment of bursts.

* * * * *